(12) United States Patent
Tsuji et al.

(10) Patent No.: US 11,813,667 B2
(45) Date of Patent: Nov. 14, 2023

(54) MOLDING MACHINE

(71) Applicant: SHIBAURA MACHINE CO., LTD., Tokyo-to (JP)

(72) Inventors: Makoto Tsuji, Kanagawa (JP); Toshiaki Toyoshima, Kanagawa (JP); Saburo Noda, Kanagawa (JP)

(73) Assignee: SHIBAURA MACHINE CO., LTD., Tokyo-to (JP)

( * ) Notice: Subject to any disclaimer, the term of this patent is extended or adjusted under 35 U.S.C. 154(b) by 0 days.

(21) Appl. No.: 17/563,121

(22) Filed: Dec. 28, 2021

(65) Prior Publication Data

US 2022/0118510 A1    Apr. 21, 2022

Related U.S. Application Data

(63) Continuation of application No. PCT/JP2020/019087, filed on May 13, 2020.

(30) Foreign Application Priority Data

Jun. 28, 2019 (JP) ................................. 2019-122281

(51) Int. Cl.
 B22D 17/26  (2006.01)
 B22D 17/22  (2006.01)

(52) U.S. Cl.
 CPC ............. *B22D 17/26* (2013.01); *B22D 17/22* (2013.01)

(58) Field of Classification Search
 CPC ................................ B22D 17/22; B22D 17/26
 USPC .......................................... 164/303, 312, 113
 See application file for complete search history.

(56) References Cited

U.S. PATENT DOCUMENTS 10,981,314 B2 * 4/2021 Okamoto et al. ..... B29C 45/766
2013/0307190 A1  11/2013 Nagatomi
2019/0016032 A1  1/2019 Okamoto et al.

FOREIGN PATENT DOCUMENTS

| EP | 3 590 678 | 8/2020 |
| JP | S58-3939 | 1/1983 |
| JP | 6-63717 | 3/1994 |
| JP | H06-91714 | 4/1994 |
| JP | 3598259 | 12/2004 |

(Continued)

OTHER PUBLICATIONS

International Preliminary Report on Patentability in PCT/JP202/019087, dated Jan. 6, 2022. 2020.

(Continued)

*Primary Examiner* — Kevin P Kerns
(74) *Attorney, Agent, or Firm* — DLA Piper LLP (US)

(57) ABSTRACT

A molding machine of an embodiment includes: a base; a fixed die plate holding a fixed die; a movable die plate provided on the base and closing direction and holding a movable die to face the fixed die; a toggle mechanism capable of clamping the fixed die and the movable die; a link housing provided on the base and allowing one end of a link of the toggle mechanism to be fixed thereto; a first motor driving the toggle mechanism; a second motor moving the movable die plate and the link housing; an extrusion plate allowing an extrusion pin to appear and disappear in the movable die; a guide bar fixed to any one of the link housing and the movable die plate, penetrating the extrusion plate, and slidably holding the extrusion plate; a positioning member positioning the extrusion plate; a tie bar; and an injection device.

13 Claims, 24 Drawing Sheets

(56) References Cited

FOREIGN PATENT DOCUMENTS

| | | |
|---|---:|---:|
| JP | 3771818 | 4/2006 |
| JP | 4808339 | 11/2011 |
| JP | 2012-136000 | 7/2012 |
| JP | 5090105 | 12/2012 |
| JP | 5803939 | 11/2015 |
| WO | WO 2012-009073 | 1/2012 |
| WO | WO 2017/164303 | 9/2017 |
| WO | WO 2018/159722 | 9/2018 |

OTHER PUBLICATIONS

International Search Report in PCT/JP202/019087, dated Jul. 6, 2020.
Chinese Office Action in Application No. 202080046379.3, dated Nov. 2, 2022.
India Office Action in Application No. 202117061826, dated Jul. 8, 2022.
Chinese Office Action in Application No. 202080046379.3, dated Jul. 19, 2023.

* cited by examiner

FIG.14 EXTRUSION RETURN STEP (S10)

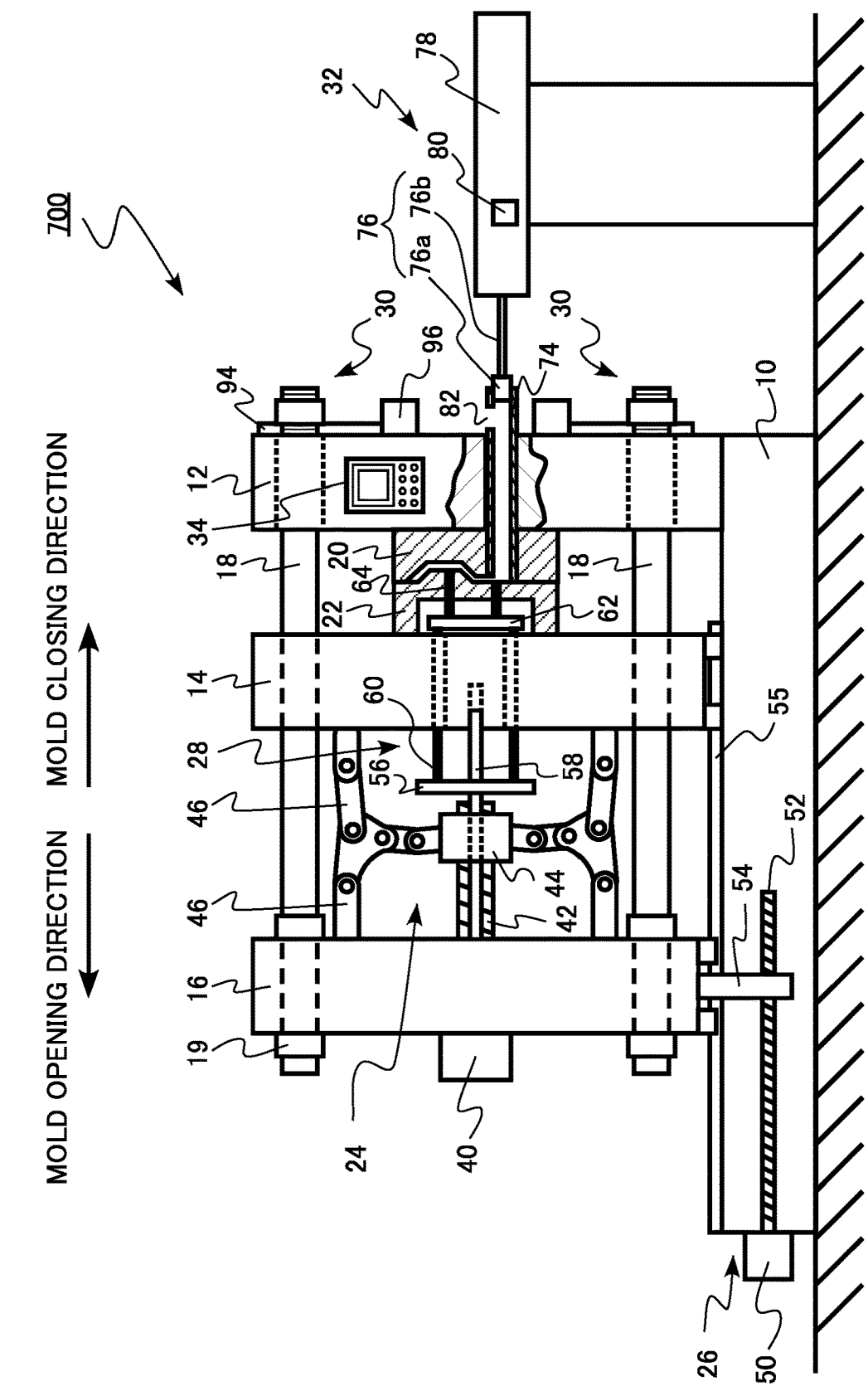

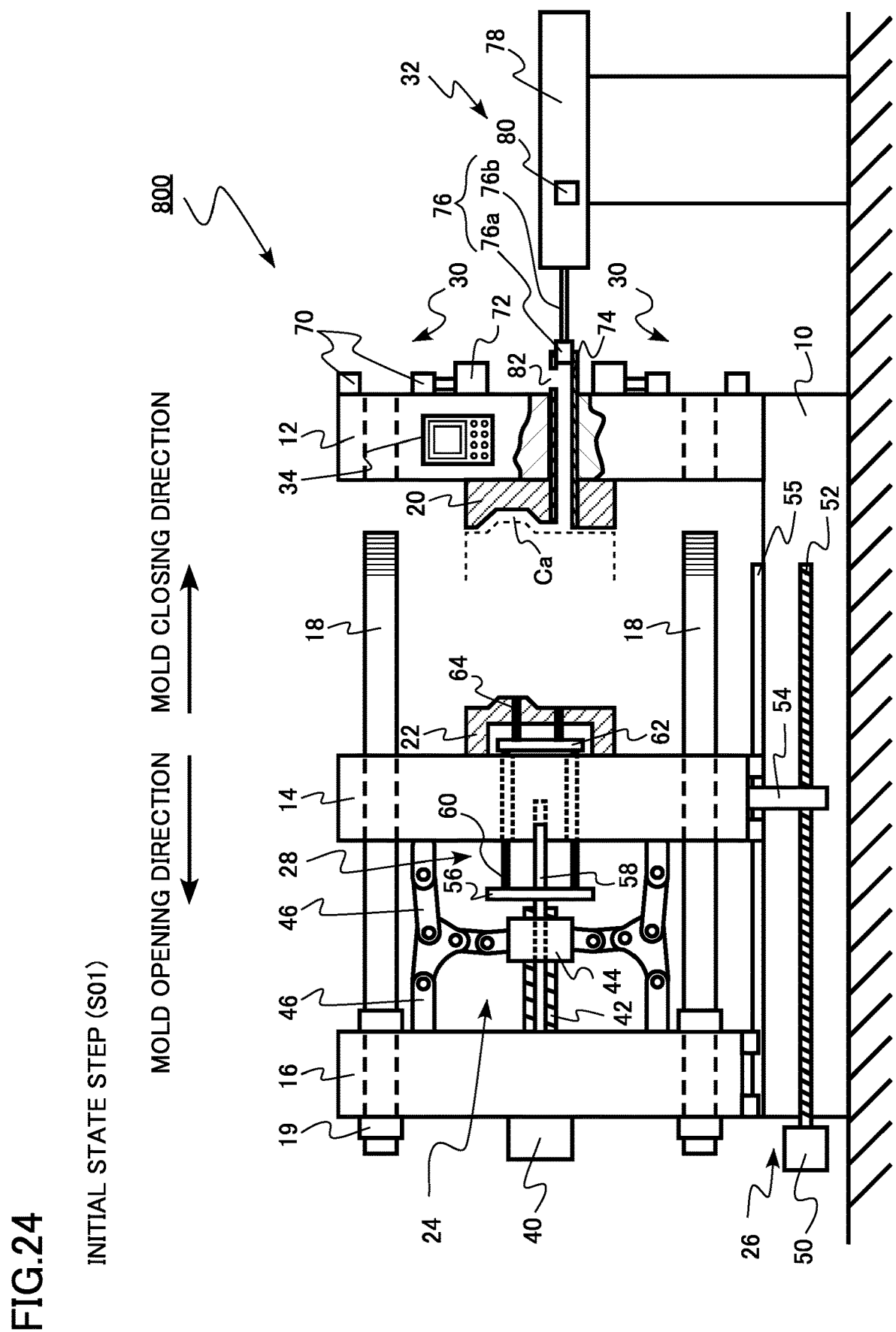

MOLDING MACHINE

CROSS-REFERENCE TO RELATED APPLICATION

This application is continuation application of, and claims the benefit of priority from the International Application PCT/JP2020/19087, filed May 13, 2020, which claims the benefit of priority from Japanese Patent Application No. 2019-122281, filed on Jun. 28, 2019, the entire contents of all of which are incorporated herein by reference.

FIELD OF THE INVENTION

The present invention relates to a molding machine including an electric toggle mechanism and an extrusion mechanism for extruding a molded product.

BACKGROUND OF THE INVENTION

In a die casting machine which is an example of a molding machine, for example, a molded product (die-cast product) is manufactured by filling a molten metal into a cavity in a mold clamped by a toggle mechanism using an injection device. The manufactured molded product is separated from the mold using an extrusion mechanism such as an extrusion pin. In order to reduce the manufacturing cost of molded product, it is desired to realize structure simplification, energy saving, and short molding cycle time of the molding machine.

SUMMARY OF THE INVENTION

A molding machine according to an aspect of the invention includes: a base; a fixed die plate fixed onto the base and holding a fixed die; a movable die plate provided on the base to be movable in a mold opening and closing direction and holding a movable die to face the fixed die; a toggle mechanism capable of clamping the fixed die and the movable die; a link housing provided on the base to be movable in the mold opening and closing direction and allowing one end of a link of the toggle mechanism to be fixed thereto; a first motor driving the toggle mechanism; a second motor moving the movable die plate and the link housing; an extrusion plate allowing an extrusion pin to appear and disappear in the movable die; a guide bar fixed to any one of the link housing and the movable die plate, penetrating the extrusion plate, and slidably holding the extrusion plate; a positioning member positioning the extrusion plate; a tie bar fixable to the link housing and the fixed die plate and extending in the mold opening and closing direction; and an injection device filling a molten metal into a cavity formed by the fixed die and the movable die.

In the molding machine of the above-described aspect, the guide bar may be fixed to the link housing.

In the molding machine of the above-described aspect, the positioning member may be fixed to the guide bar.

In the molding machine of the above-described aspect, the positioning member may be a pair of annular members provided to sandwich the extrusion plate.

In the molding machine of the above-described aspect, a gap between the pair of annular members may be larger than a thickness of the extrusion plate.

In the molding machine of the above-described aspect, a difference between the gap between the pair of annular members and the thickness of the extrusion plate may be 10 mm or less.

In the molding machine of the above-described aspect, the guide bar may be fixed to the movable die plate.

In the molding machine of the above-described aspect, a displacement amount of a gap between the link housing and the movable die plate may be 210 mm or less.

In the molding machine of the above-described aspect, the tie bar may be fixed to any one of the link housing and the fixed die plate and may be slidable with respect to the other of the link housing and the fixed die plate.

The molding machine of the above-described aspect may further include a fixing mechanism fixing the tie bar to a desired position in the other of the link housing and the fixed die plate.

In the molding machine of the above-described aspect, the tie bar may be fixed to the link housing and an end portion on the side of the fixed die plate in the tie bar at the most separation position between the link housing and the fixed die plate may be located on the side of the movable die plate in relation to the fixed die plate.

In the molding machine of the above-described aspect, the link housing may be driven by the second motor.

In the molding machine of the above-described aspect, the movable die plate may be driven.

Effect of the Invention

According to the invention, it is possible to provide a molding machine having a simplified structure.

BRIEF DESCRIPTION OF DRAWINGS

FIG. 23 is a schematic view showing the entire configuration of the molding machine of the seventh embodiment.

FIG. 24 is a schematic view showing an entire configuration of a molding machine of an eighth embodiment.

MODE(S) FOR CARRYING OUT THE INVENTION

Hereinafter, embodiments of the invention will be described with reference to the drawings.

First Embodiment

A molding machine of a first embodiment includes: a base; a fixed die plate fixed onto the base and holding a fixed die; a movable die plate provided on the base to be movable in a mold opening and closing direction and holding a movable die to face the fixed die; a toggle mechanism capable of clamping the fixed die and the movable die; a link housing provided on the base to be movable in the mold opening and closing direction and allowing one end of a link of the toggle mechanism to be fixed thereto; a first motor driving the toggle mechanism; a second motor moving the movable die plate and the link housing; an extrusion plate allowing an extrusion pin to appear and disappear in the movable die; a guide bar fixed to any one of the link housing and the movable die plate, penetrating the extrusion plate, and slidably holding the extrusion plate; a positioning member positioning the extrusion plate; a tie bar fixable to the link housing and the fixed die plate and extending in the mold opening and closing direction; and an injection device filling a molten metal into a cavity formed by the fixed die and the movable die.

Figure 1:
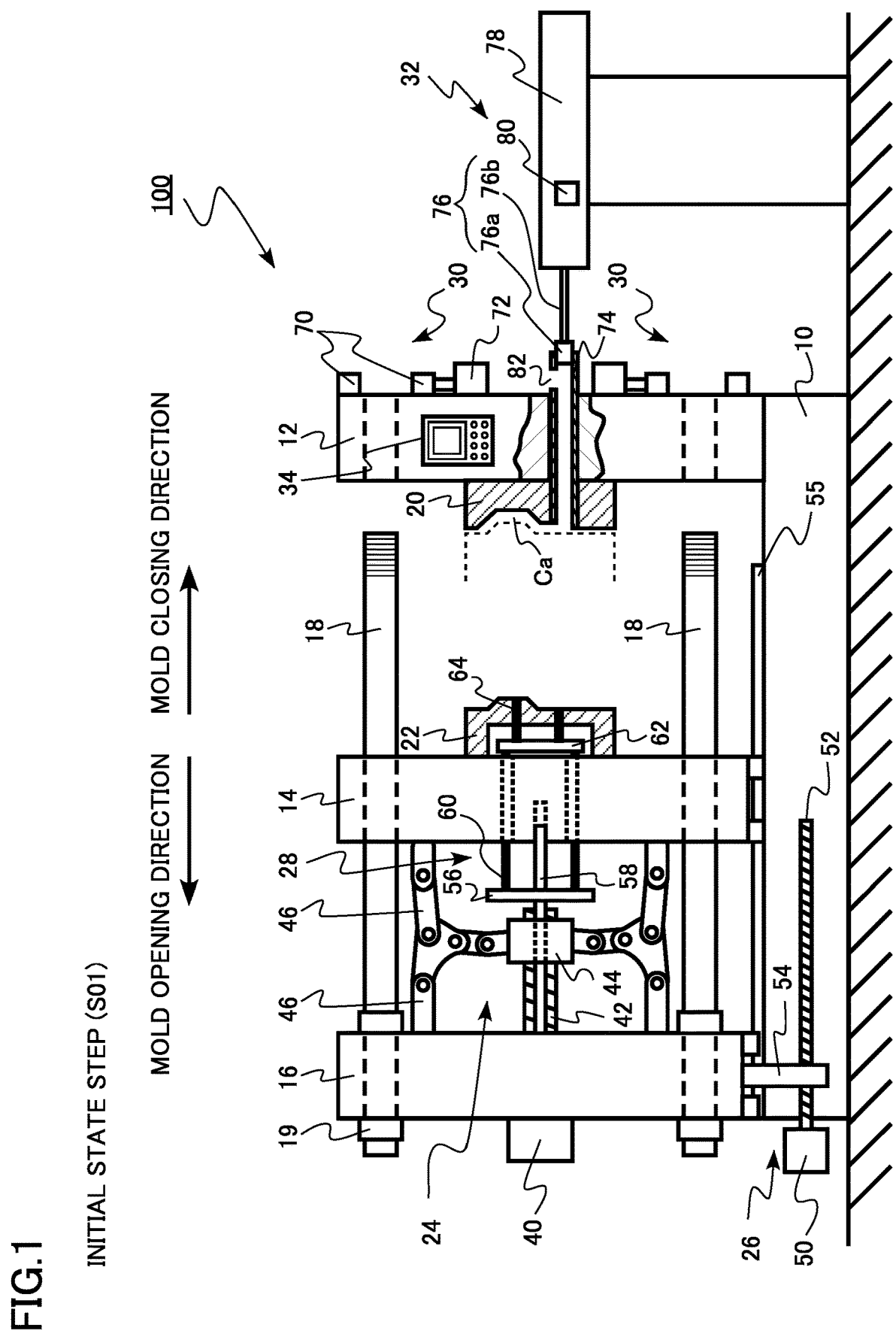
FIG. 1 is a schematic view showing an entire configuration of a molding machine of a first embodiment.
Figure 2:
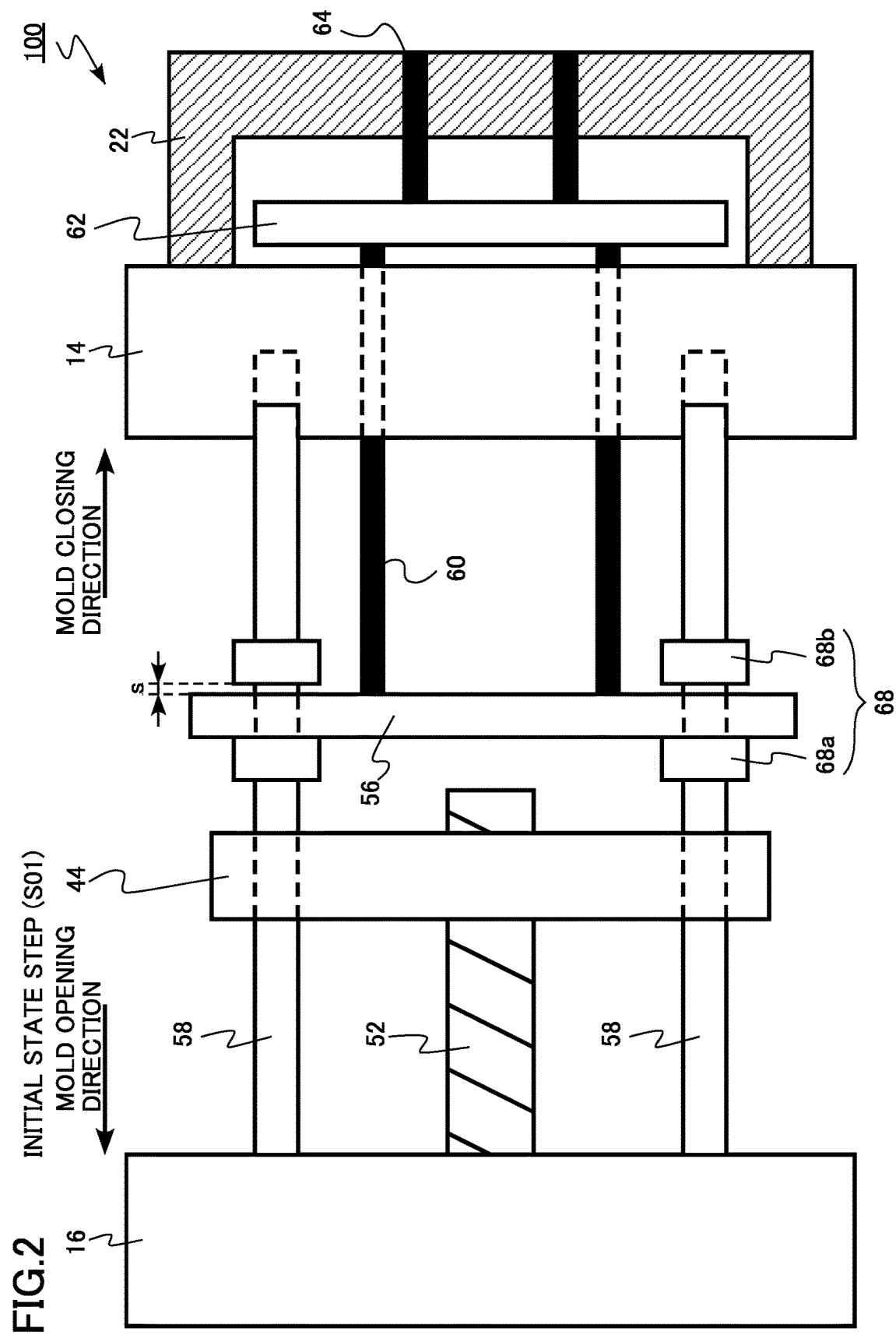
FIG. 2 is an enlarged schematic view of an extrusion mechanism of the molding machine of the first embodiment.

FIG. 1 is a schematic view showing the entire configuration of the molding machine of the first embodiment. FIG. 1 is a side view including a cross-sectional view in part. FIG. 2 is an enlarged schematic view of the extrusion mechanism of the molding machine of the first embodiment. FIG. 2 is a plan view including a cross-sectional view in part.

The molding machine of the first embodiment is a die casting machine. A die casting machine 100 of the first embodiment is a cold chamber type die casting machine.

FIGS. 1 and 2 show an initial state before the start of the operation of the die casting machine 100. The initial state in this case is a state in which the mold is fully opened, that is, a so-called mold opening state.

The die casting machine 100 is a machine that manufactures a die-cast product by injecting a liquid metal (molten metal) into a mold (cavity Ca in FIG. 1) and solidifying the liquid metal in the mold. The metal is, for example, aluminum, an aluminum alloy, a zinc alloy, or a magnesium alloy.

The die casting machine 100 includes a base 10, a fixed die plate 12, a movable die plate 14, a link housing 16, a tie bar 18, a tie bar nut 19, a fixed die 20, a movable die 22, a toggle mechanism 24, a toggle moving mechanism 26, an extrusion mechanism 28, a tie bar fixing mechanism 30, an injection device 32, and an input display device 34.

The toggle mechanism 24 includes a mold clamping motor 40 (first motor), a first screw shaft 42, a crosshead 44, and a plurality of links 46. The mold clamping motor 40 is an electric motor.

The toggle moving mechanism 26 includes a toggle moving motor 50 (second motor), a second screw shaft 52, a nut portion 54, and a guide rail 55. The toggle moving motor 50 is an electric motor.

The extrusion mechanism 28 includes an extrusion plate 56, a guide bar 58, an extrusion shaft 60, a pin support plate 62, an extrusion pin 64, and a positioning member 68.

The tie bar fixing mechanism 30 includes a half nut 70 and a tie bar fixing motor 72.

The injection device 32 includes a sleeve 74, a plunger 76, an injection drive unit 78, and a position sensor 80. The plunger 76 includes a plunger tip 76a and a plunger rod 76b. An opening 82 is provided in the sleeve 74.

The fixed die plate 12 is fixed onto the base 10. The fixed die 20 is attachable to the fixed die plate 12.

The movable die plate 14 is provided on the base 10 to be movable in the mold opening and closing direction. The mold opening and closing direction means both the mold opening direction and the mold closing direction shown in FIG. 1 and the like. The movable die plate 14 moves on the guide rail 55 provided on the base 10 in the mold opening and closing direction. The movable die 22 is attachable to the movable die plate 14.

The link housing 16 is provided on the base 10 to be movable in the mold opening and closing direction. The link housing 16 moves on the guide rail 55 provided on the base 10 in the mold opening and closing direction. One end of a part of the plurality of links 46 is fixed to the link housing 16.

The toggle mechanism 24 is provided between the link housing 16 and the movable die plate 14. One end of a part of the plurality of links 46 is fixed to the link housing 16. Further, one end of another part of the plurality of links 46 is fixed to the movable die plate 14.

The distance between the link housing 16 and the movable die plate 14 is changed by the toggle mechanism 24. The displacement amount of the gap between the link housing 16 and the movable die plate 14 is, for example, 50 mm or more and 210 mm or less.

The fixed die 20 and the movable die 22 can be clamped by the toggle mechanism 24. Further, it is possible to extrude the manufactured die-cast product from the mold by interlocking the toggle mechanism 24 and the extrusion mechanism 28.

The toggle mechanism 24 is driven by using the mold clamping motor 40. When the first screw shaft 42 is rotated by the mold clamping motor 40, the crosshead 44 moves in the mold opening and closing direction. In accordance with the movement of the crosshead 44 in the mold opening and closing direction, the plurality of links 46 are operated and the movable die plate 14 relatively moves in the mold opening and closing direction with respect to the link housing 16.

The tie bar 18 extends in the mold opening and closing direction. For example, four tie bars 18 are provided.

The tie bar 18 can be fixed to the link housing 16 and the fixed die plate 12. The tie bar 18 is fixed to the link housing 16 by the tie bar nut 19. The tie bar 18 penetrates the movable die plate 14. The tie bar 18 is slidable with respect to the fixed die plate 12.

The tie bar fixing mechanism 30 is provided in the fixed die plate 12. The tie bar 18 can be fixed or non-fixed (released) to the fixed die plate 12 by using the tie bar fixing mechanism 30. The tie bar fixing mechanism 30 fixes the tie bar 18 to a desired position.

For example, a saw-shaped groove is provided at the tip on the side of the fixed die plate 12 in the tie bar 18. The tie bar fixing mechanism 30 controls the opening and closing of the half nut 70, for example, by the tie bar fixing motor 72. For example, when the half nut 70 is closed, the half nut 70 is fitted into the groove of the tip of the tie bar 18 so that the tie bar 18 is fixed to the fixed die plate 12.

The tie bar 18 supports a mold clamping force while the mold clamping force is applied to the fixed die 20 and the movable die 22.

The tie bar 18 is fixed to the link housing 16 and an end portion on the side of the fixed die plate 12 in the tie bar 18 at the most separation position between the link housing 16 and the fixed die plate 12 is located on the side of the movable die plate 14 in relation to the fixed die plate 12. The end portion on the side of the fixed die plate 12 in the tie bar 18 at the most separation position between the link housing 16 and the fixed die plate 12 is located between the fixed die plate 12 and the movable die plate 14.

Further, in the tie bar 18, the end portion on the side of the fixed die plate 12 in the tie bar 18 at the most separation position between the movable die plate 14 and the fixed die plate 12 is located on the side of the movable die plate 14 in relation to the fixed die plate 12. The end portion on the side of the fixed die plate 12 in the tie bar 18 at the most separation position between the movable die plate 14 and the fixed die plate 12 is located between the fixed die plate 12 and the movable die plate 14.

The toggle moving mechanism 26 moves the movable die plate 14 and the link housing 16. The toggle moving mechanism 26 moves the movable die plate 14 and the link housing 16 using the toggle moving motor 50.

The nut portion 54 is fixed to the link housing 16. When the second screw shaft 52 is rotated by the toggle moving motor 50, the nut portion 54 moves in the mold opening and closing direction. When the nut portion 54 moves in the mold opening and closing direction, the movable die plate 14 connected to the link housing 16 is moved in the mold opening and closing direction by the plurality of links 46 and the link housing 16 fixed to the nut portion 54. The link housing 16 and the movable die plate 14 move on the guide rail 55. The toggle moving motor 50 drives the link housing 16 instead of the movable die plate 14 through the second screw shaft 52 and the nut portion 54.

The extrusion mechanism 28 includes, as shown in FIG. 2, the extrusion plate 56, the guide bar 58, the extrusion shaft 60, the pin support plate 62, the extrusion pin 64, and the positioning member 68. The extrusion mechanism 28 has a function of extruding the manufactured die-cast product from the mold and separating the die-cast product.

The extrusion plate 56 is provided between the crosshead 44 and the movable die plate 14. One end of the extrusion shaft 60 extending in the mold closing direction is fixed to the extrusion plate 56. The extrusion shaft 60 penetrates the movable die plate 14. The extrusion shaft 60 is slidable with respect to the movable die plate 14.

The other end of the extrusion shaft 60 is fixed to the pin support plate 62. The extrusion pin 64 is fixed to the pin support plate 62. The extrusion pin 64 is relatively fixed to the extrusion plate 56. The extrusion plate 56 allows the extrusion pin 64 to appear and disappear in the movable die 22.

The extrusion pin 64 is provided to appear and disappear in the movable die 22. The extrusion pin 64 extends in the mold closing direction. For example, a plurality of the extrusion pins 64 are provided.

The guide bar 58 is fixed to the link housing 16. The guide bar 58 extends in the mold closing direction. The guide bar 58 penetrates the crosshead 44 and the extrusion plate 56. The crosshead 44 and the extrusion plate 56 are provided to be slidable with respect to the guide bar 58. The guide bar 58 slidably holds the extrusion plate 56.

The positioning member 68 is fixed to the guide bar 58. The positioning member 68 is relatively fixed to the link housing 16.

The positioning member 68 includes a first member 68a and a second member 68b. The extrusion plate 56 is positioned by the first member 68a and the second member 68b.

Both the first member 68a and the second member 68b are fixed to the guide bar 58. The first member 68a and the second member 68b are, for example, a pair of annular members provided to sandwich the extrusion plate 56. For example, the guide bar 58 penetrates the first member 68a and the second member 68b.

The gap between the first member 68a and the second member 68b is larger than the thickness of the extrusion plate 56 in the mold opening and closing direction. A difference between the gap between the first member 68a and the second member 68b and the thickness of the extrusion plate 56 in the mold opening and closing direction is, for example, several mm. A difference between the gap between the first member 68a and the second member 68b and the thickness of the extrusion plate 56 in the mold opening and closing direction is, for example, 1 mm or more and 10 mm or less.

The injection device 32 has a function of injecting a liquid metal into the cavity Ca inside the mold. The injection device 32 includes the sleeve 74, the plunger 76, the injection drive unit 78, and the position sensor 80.

The plunger 76 includes the plunger tip 76a and the plunger rod 76b. An opening 82 is provided in the sleeve 74.

The sleeve 74 passes through the fixed die 20. The sleeve 74 is, for example, a tubular member connected to the fixed die 20. The sleeve 74 has, for example, a cylindrical shape.

The plunger 76 slides in the sleeve 74. The plunger tip 76a fixed to the tip of the plunger rod 76b slides inside the sleeve 74 in the front and rear direction. When the plunger tip 76a slides forward in the sleeve 74, the molten metal in the sleeve 74 is filled into the cavity Ca formed by the fixed die 20 and the movable die 22.

The injection drive unit 78 has a function of driving the plunger 76 in the front and rear direction. The injection drive unit 78 is, for example, a hydraulic type, an electric type, or a hybrid type in which a hydraulic type and an electric type are combined.

The position sensor 80 has a function of detecting the position of the plunger 76. The position sensor 80 is, for example, an optical or magnetic linear encoder. By differentiating the position of the plunger 76 detected by the position sensor 80, it is possible to detect the speed of the plunger 76.

The input display device 34 is provided in, for example, the fixed die plate 12. The input display device 34 receives, for example, an operator's input operation. The operator can set the molding conditions and the like of the die casting machine 100 using the input display device 34. Further, the input display device 34 displays, for example, the molding conditions, the operating status, and the like of the die casting machine 100 on the screen. The input display device 34 is, for example, a liquid crystal display or an organic EL display.

Figure 3:
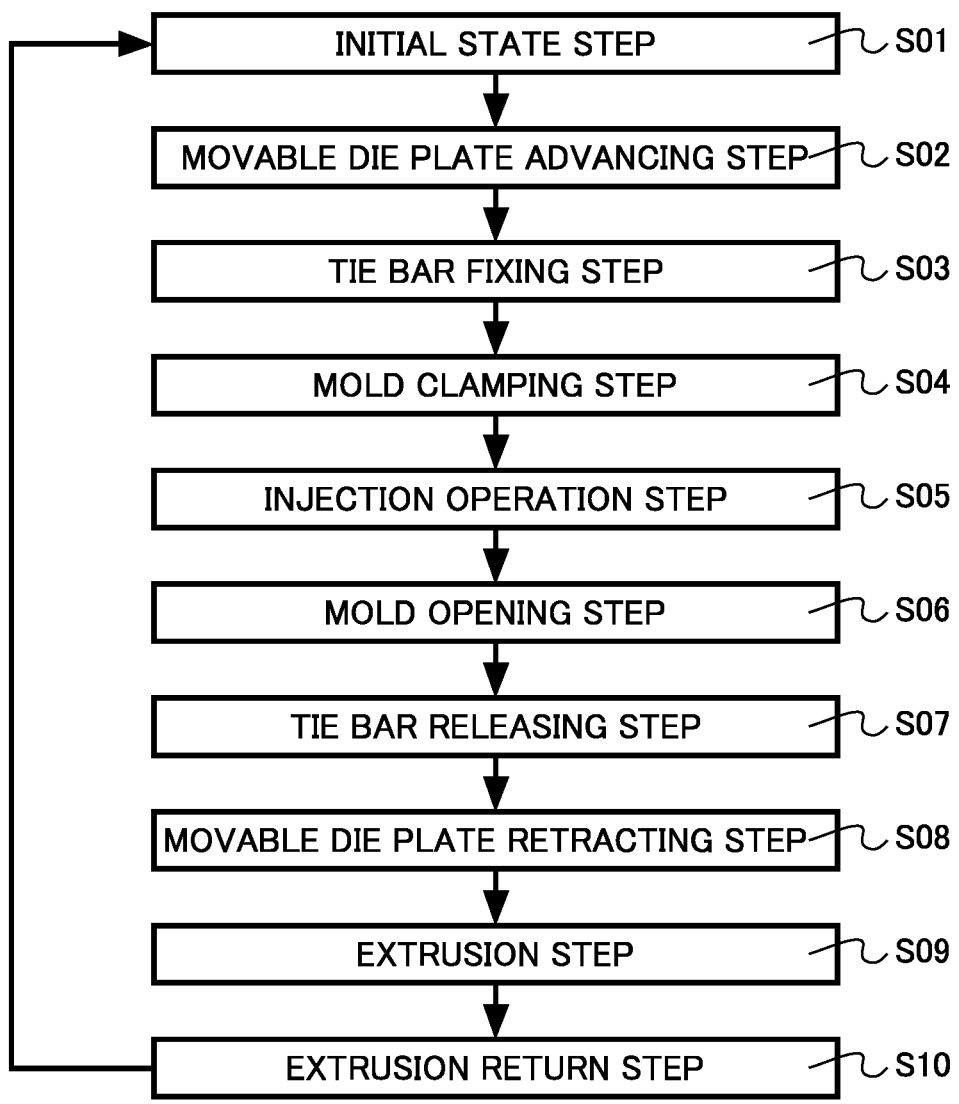
FIG. 3 is a flowchart of a molding operation of the molding machine of the first embodiment.

Next, the molding operation using the molding machine of the first embodiment will be described with reference to FIGS. 1 to 15. FIG. 3 is a flowchart of the molding operation of the molding machine of the first embodiment. FIGS. 4 to 15 are explanatory diagrams of the molding operation using the molding machine of the first embodiment.

The molding operation of the die casting machine 100 of the first embodiment includes, as shown in FIG. 3, an initial state step (S01), a movable die plate advancing step (S02), a tie bar fixing step (S03), a mold clamping step (S04), an injection operation step (S05), a mold opening step (S06), a tie bar releasing step (S07), a movable die plate retracting step (S08), an extrusion step (S09), and an extrusion return step (S10).

First, the die casting machine 100 is in the initial state step (S01) (FIGS. 1 and 2). The initial state is a so-called mold opening state. At this time, as shown in FIG. 2, a gap (s in FIG. 2) corresponding to the mold clamping stroke is provided between the extrusion plate 56 and the second member 68b of the positioning member 68.

The gap s corresponding to the mold clamping stroke is, for example, several mm. The gap s is, for example, 1 mm or more and 10 mm or less.

Next, the link housing 16 and the movable die plate 14 are advanced in the mold closing direction in the movable die plate advancing step (S02). The link housing 16 and the movable die plate 14 are moved by using the toggle moving mechanism 26. The link housing 16 and the movable die plate 14 advance until the movable die 22 contacts the fixed die 20.

Figure 4:
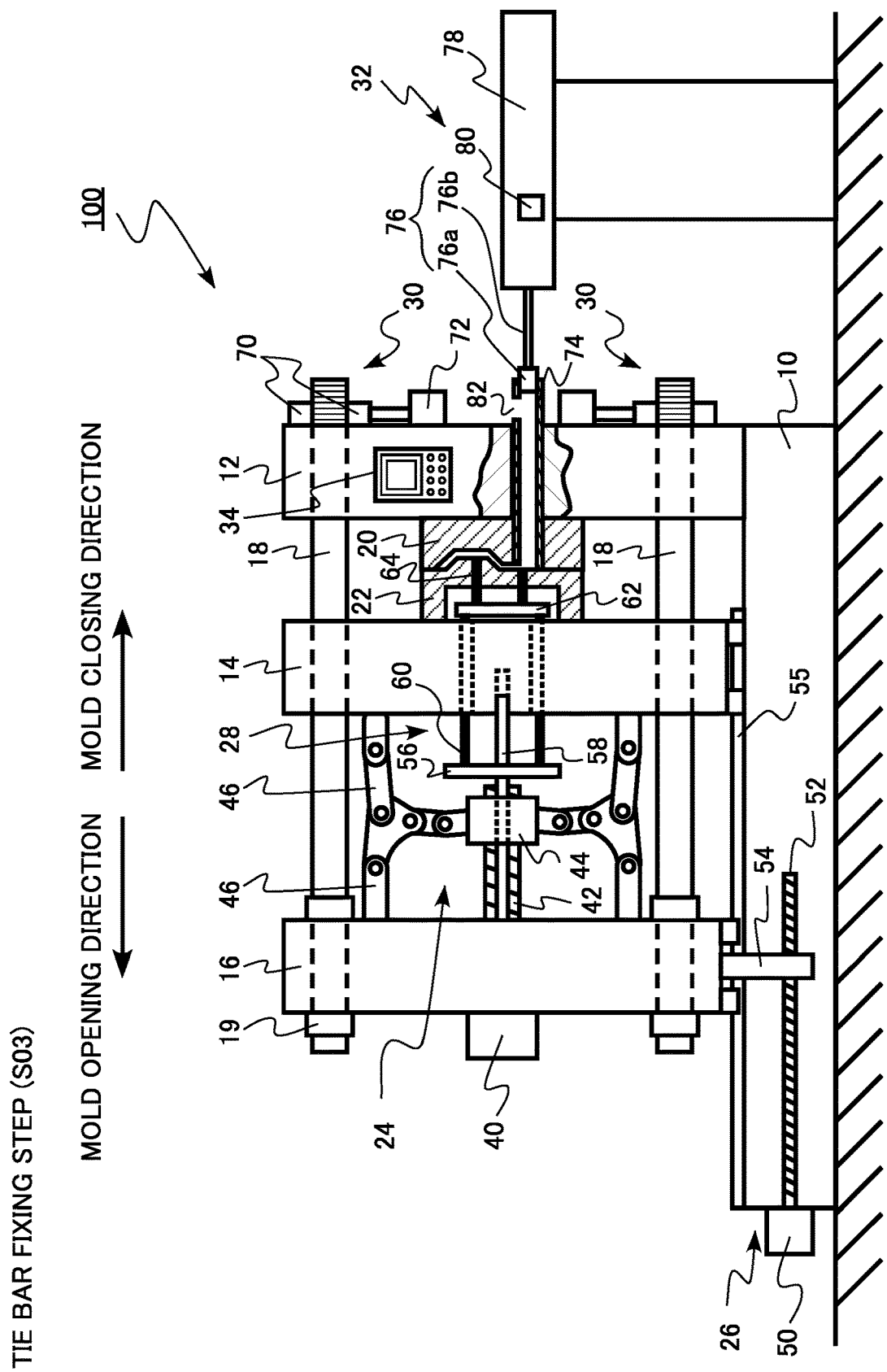
FIG. 4 is an explanatory diagram of the molding operation using the molding machine of the first embodiment.

Next, the tie bar 18 penetrating the fixed die plate 12 is fixed to the fixed die plate 12 by using the tie bar fixing mechanism 30 in the tie bar fixing step (S03) (FIG. 4). Specifically, when the half nut 70 is closed by the tie bar fixing motor 72, the half nut 70 is fitted into the groove of the tip of the tie bar 18 so that the tie bar 18 is fixed to the fixed die plate 12.

Figure 5:
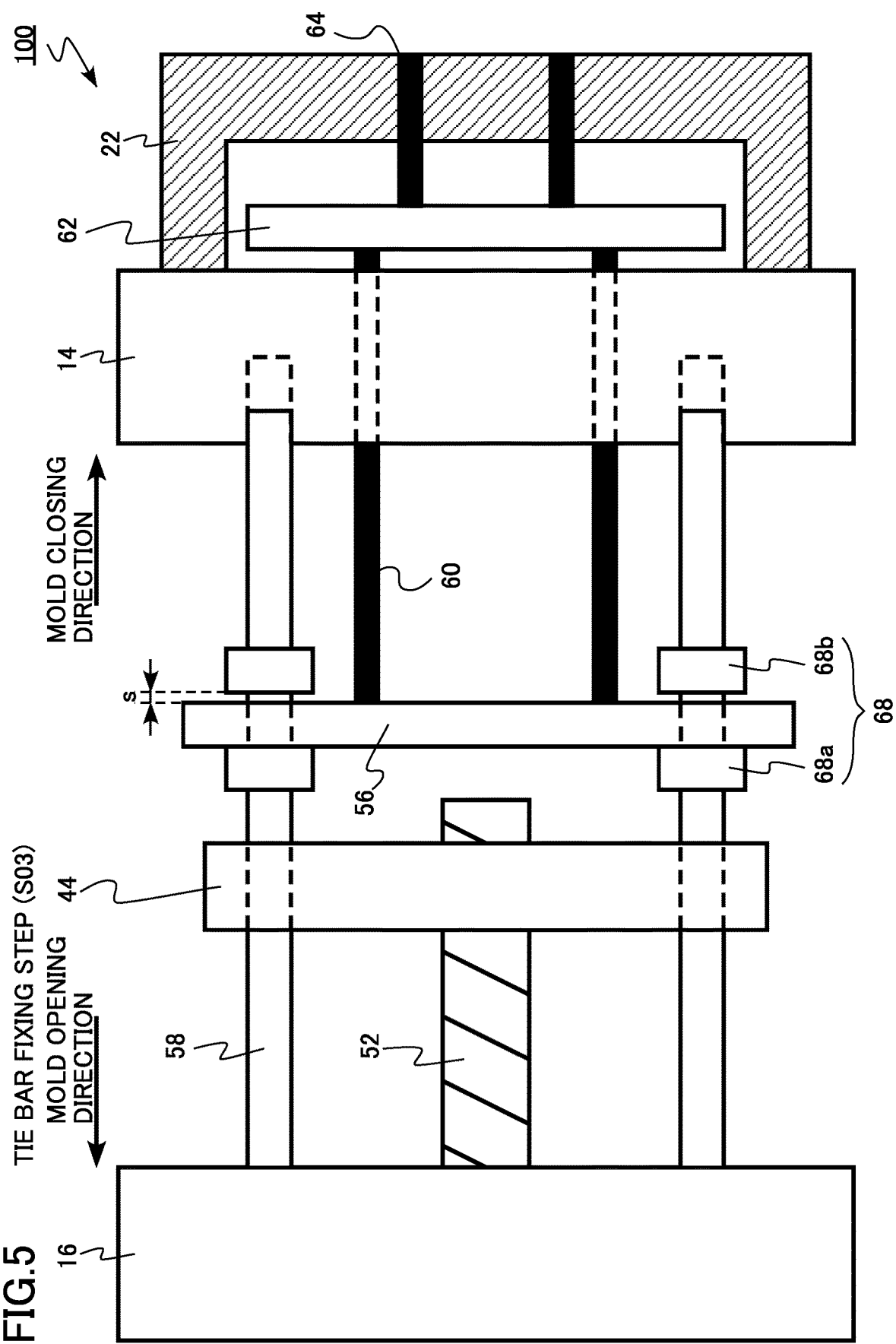
FIG. 5 is an explanatory diagram of the molding operation using the molding machine of the first embodiment.

In a state in which the movable die 22 contacts the fixed die 20, as shown in FIG. 5, the gap (s in FIG. 5) corresponding to the mold clamping stroke is maintained between the extrusion plate 56 and the second member 68b.

Figure 6:
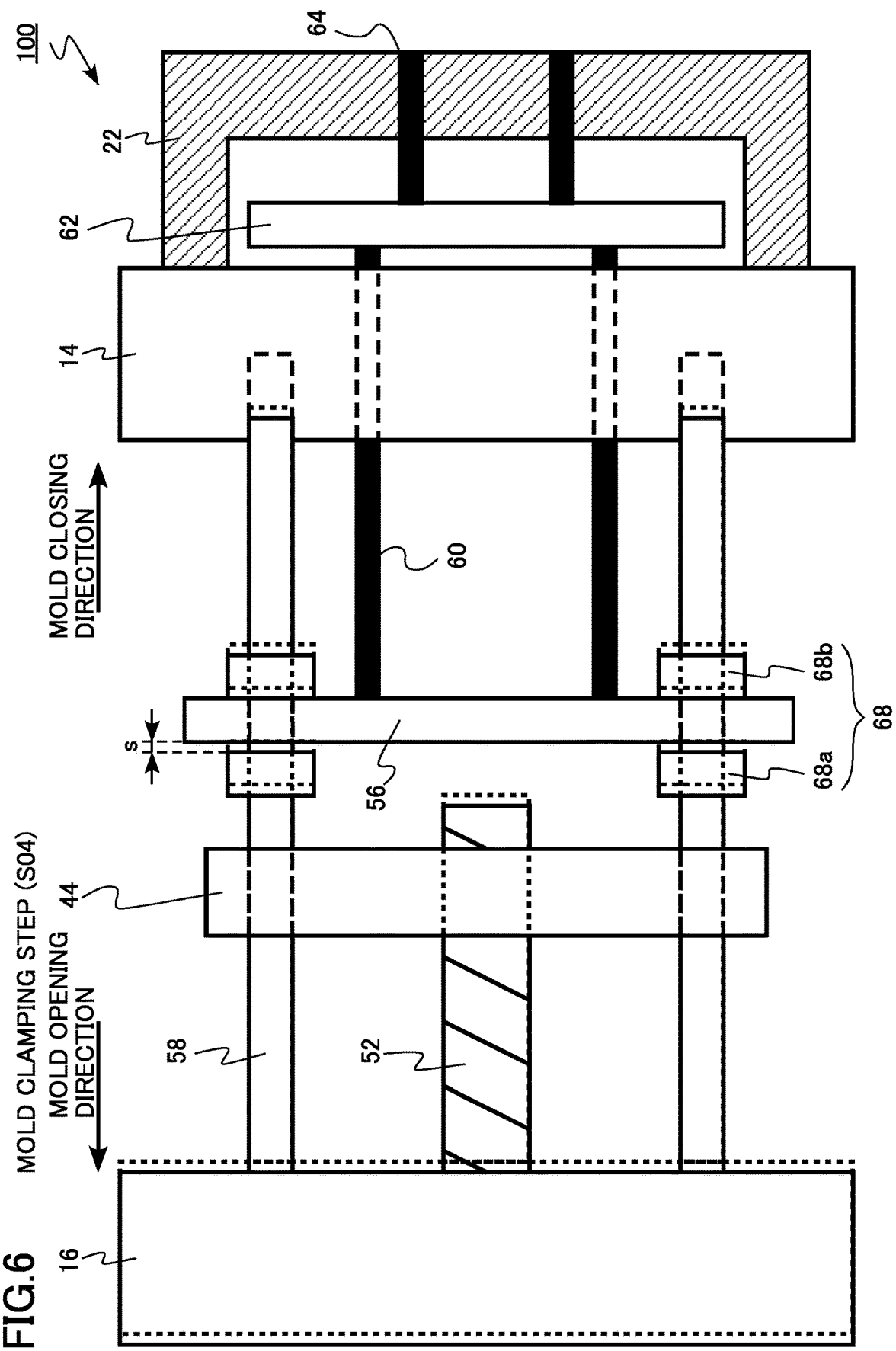
FIG. 6 is an explanatory diagram of the molding operation using the molding machine of the first embodiment.

Next, the mold is clamped using the toggle mechanism 24 in the mold clamping step (S04) (FIG. 6). A mold clamping force is applied across the fixed die 20 and the movable die 22. The mold clamping stroke is, for example, several mm. The gap s is, for example, 1 mm or more and 10 mm or less. The distance between the link housing 16 and the movable die plate 14 is widened by the distance corresponding to the mold clamping stroke. FIG. 6 shows a state in which the link housing 16 and the like move in the mold opening direction. The positions of the link housing 16 and the like in the tie bar fixing step (S03) are indicated by the dashed line.

At the time of performing the mold clamping operation using the toggle mechanism 24, as shown in FIG. 6, the extrusion plate 56 moves in the mold closing direction with respect to the guide bar 58 by the distance of the mold clamping stroke and the extrusion plate 56 contacts the second member 68b.

Figure 7:
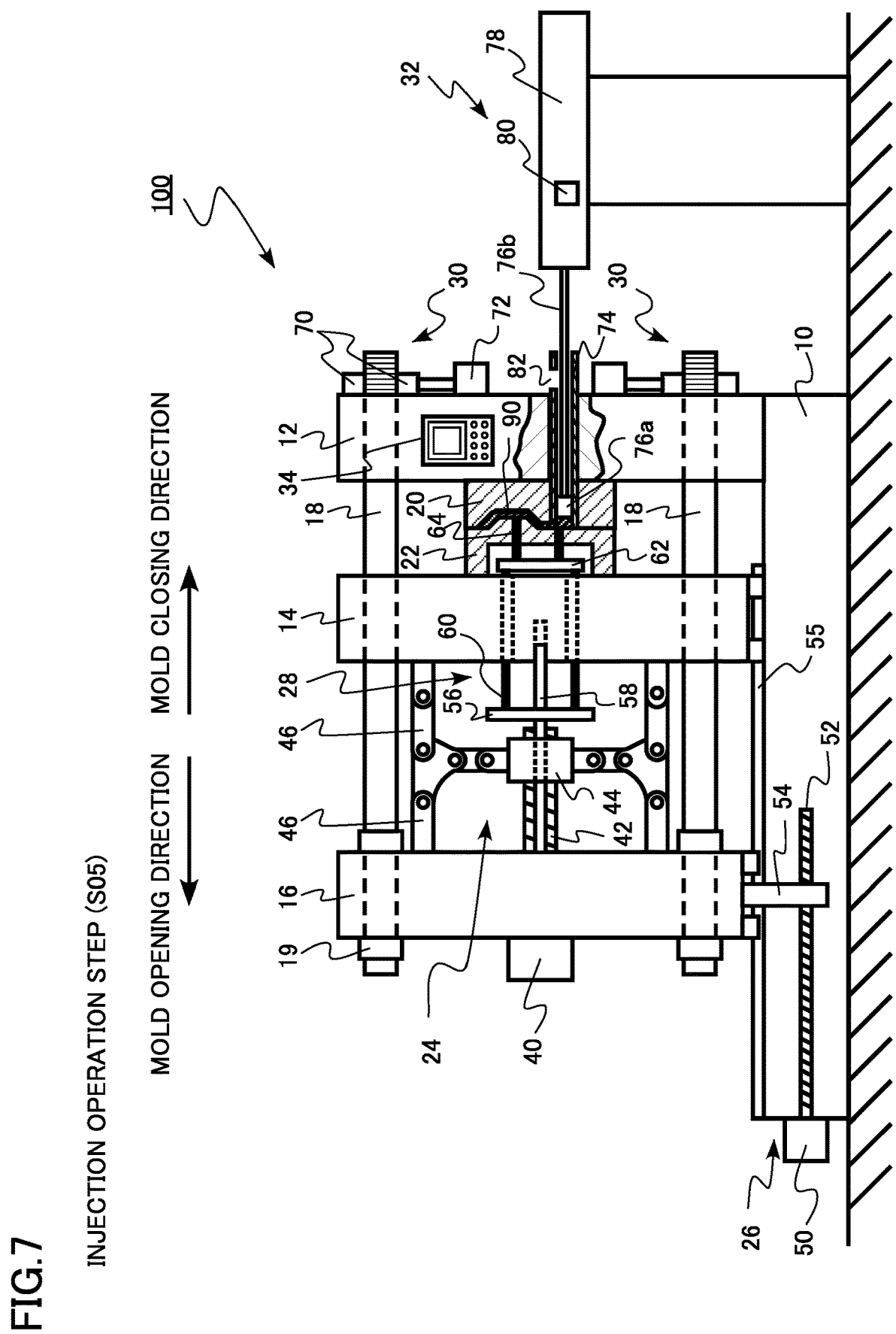
FIG. 7 is an explanatory diagram of the molding operation using the molding machine of the first embodiment.

Next, an injection operation is performed using the injection device 32 in the injection operation step (S05) (FIG. 7). Specifically, a molten metal is supplied from the opening 82 into the sleeve 74 using, for example, a hopper or the like (not shown). Then, the plunger tip 76a is advanced in the sleeve 74 so that the molten metal is filled into the cavity Ca in the mold. A die-cast product 90 is manufactured by clamping the molten metal filled in the cavity Ca in the mold.

Figure 8:
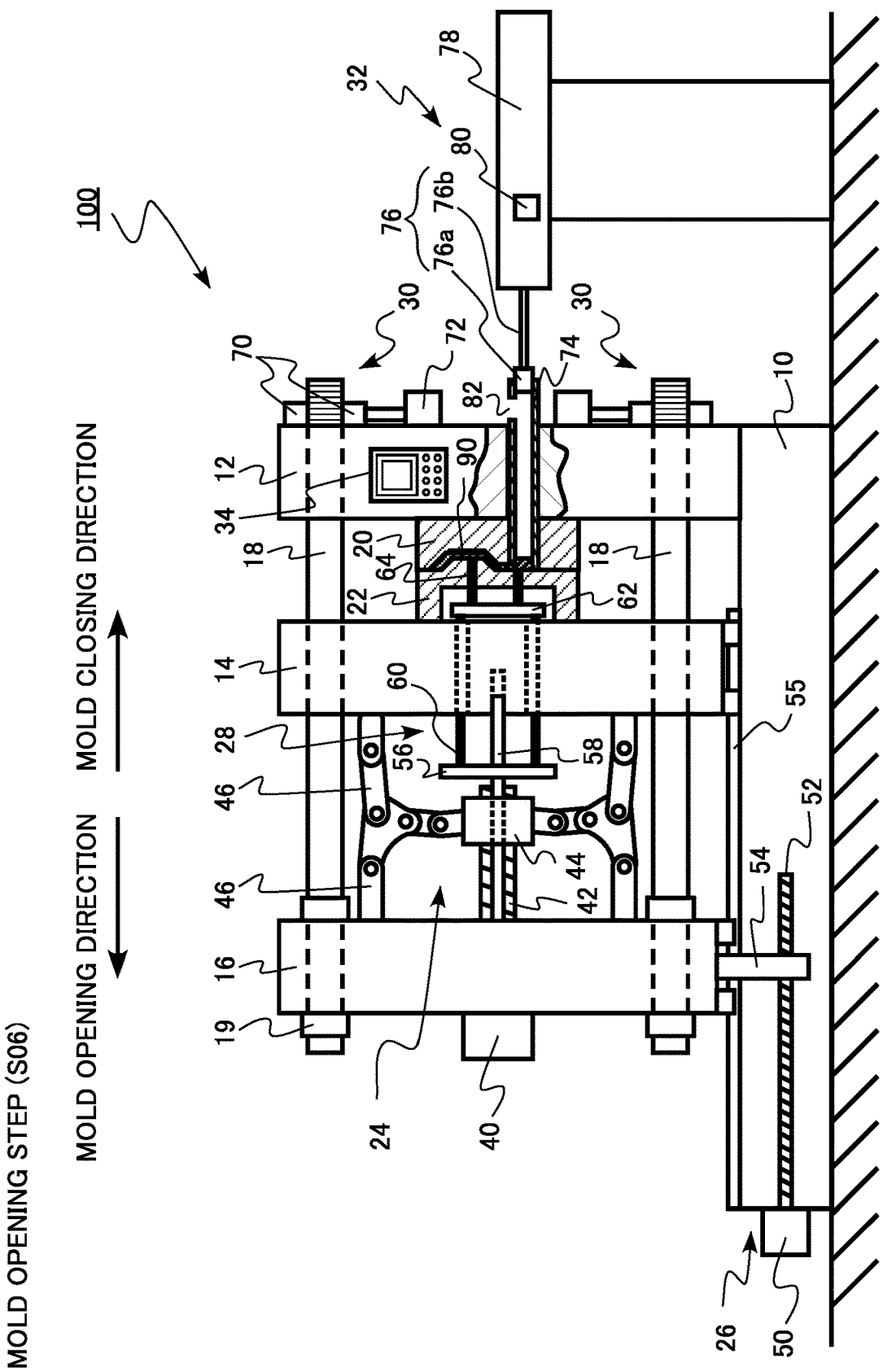
FIG. 8 is an explanatory diagram of the molding operation using the molding machine of the first embodiment.

Next, the mold is opened using the toggle mechanism 24 after retracting the plunger tip 76a in the mold opening step (S06) (FIG. 8). The mold opening stroke is, for example, several mm. The distance between the link housing 16 and the movable die plate 14 is narrowed by the distance corresponding to the mold clamping stroke.

Figure 9:
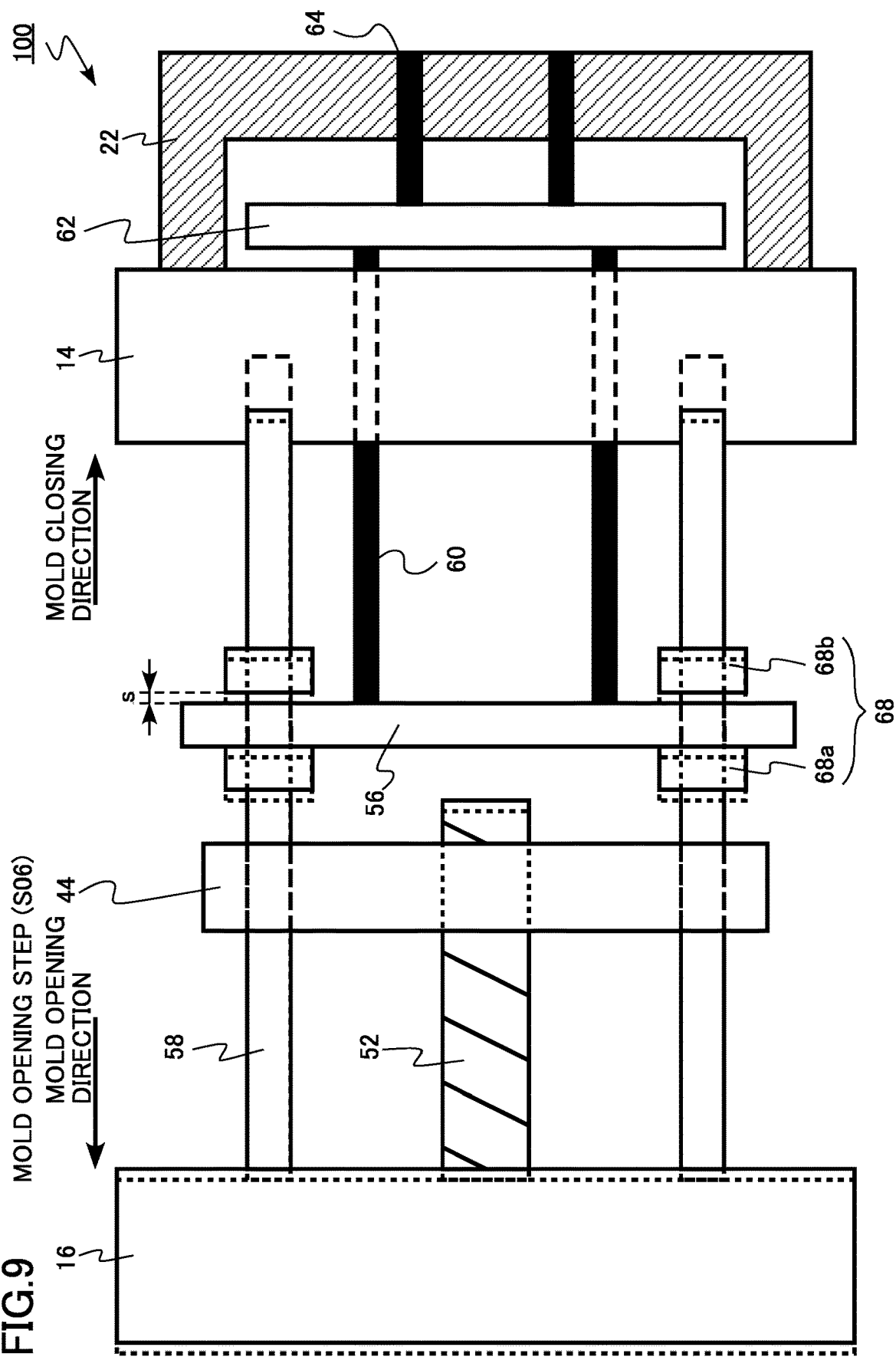
FIG. 9 is an explanatory diagram of the molding operation using the molding machine of the first embodiment.

FIG. 9 shows a state in which the link housing 16 and the like move in the mold closing direction. The positions of the link housing 16 and the like in the injection operation step (S05) are indicated by the dashed line. At the time of performing the mold opening operation using the toggle mechanism 24, as shown in FIG. 9, the extrusion plate 56 moves in the mold opening direction by the distance corresponding to the mold clamping stroke with respect to the guide bar 58 and for example, the extrusion plate 56 contacts the first member 68a.

During the injection operation, as shown in FIG. 6, a gap (s in FIG. 6) corresponding to the mold clamping stroke is provided between the extrusion plate 56 and the first member 68a. Therefore, the extrusion plate 56 is movable in the direction of the first member 68a in the mold opening step (S06). For example, since the extrusion plate 56 moves in the direction of the first member 68a, the damage of the die-cast product 90 pressed by the extrusion pin 64 in the mold opening step (S06) is suppressed.

Next, the tie bar 18 fixed to the fixed die plate 12 using the tie bar fixing mechanism 30 is released in the tie bar releasing step (S07). Specifically, the half nut 70 is opened by the tie bar fixing motor 72 so that the tie bar 18 is not fixed to the fixed die plate 12.

Figure 10:
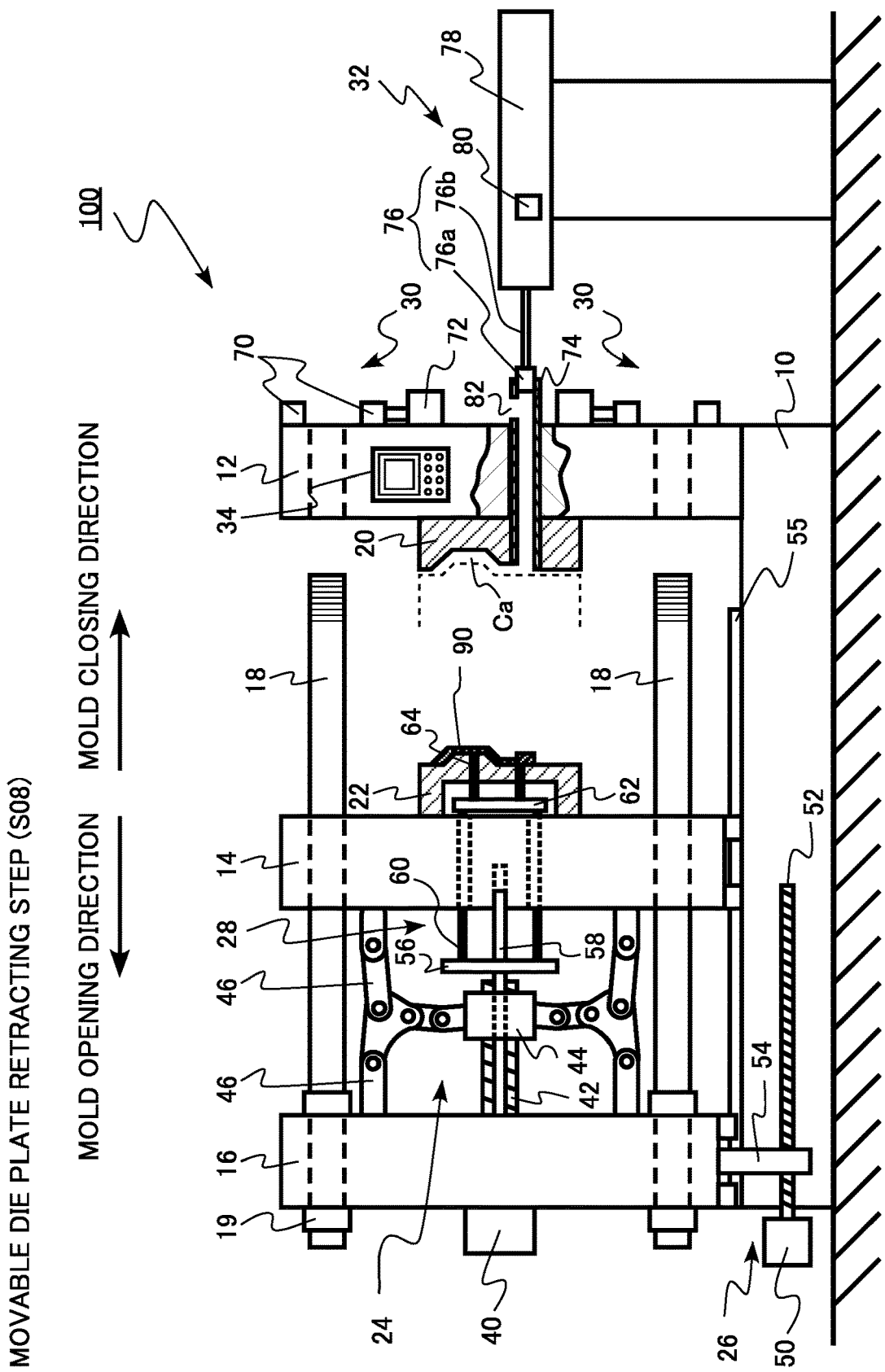
FIG. 10 is an explanatory diagram of the molding operation using the molding machine of the first embodiment.
Figure 11:
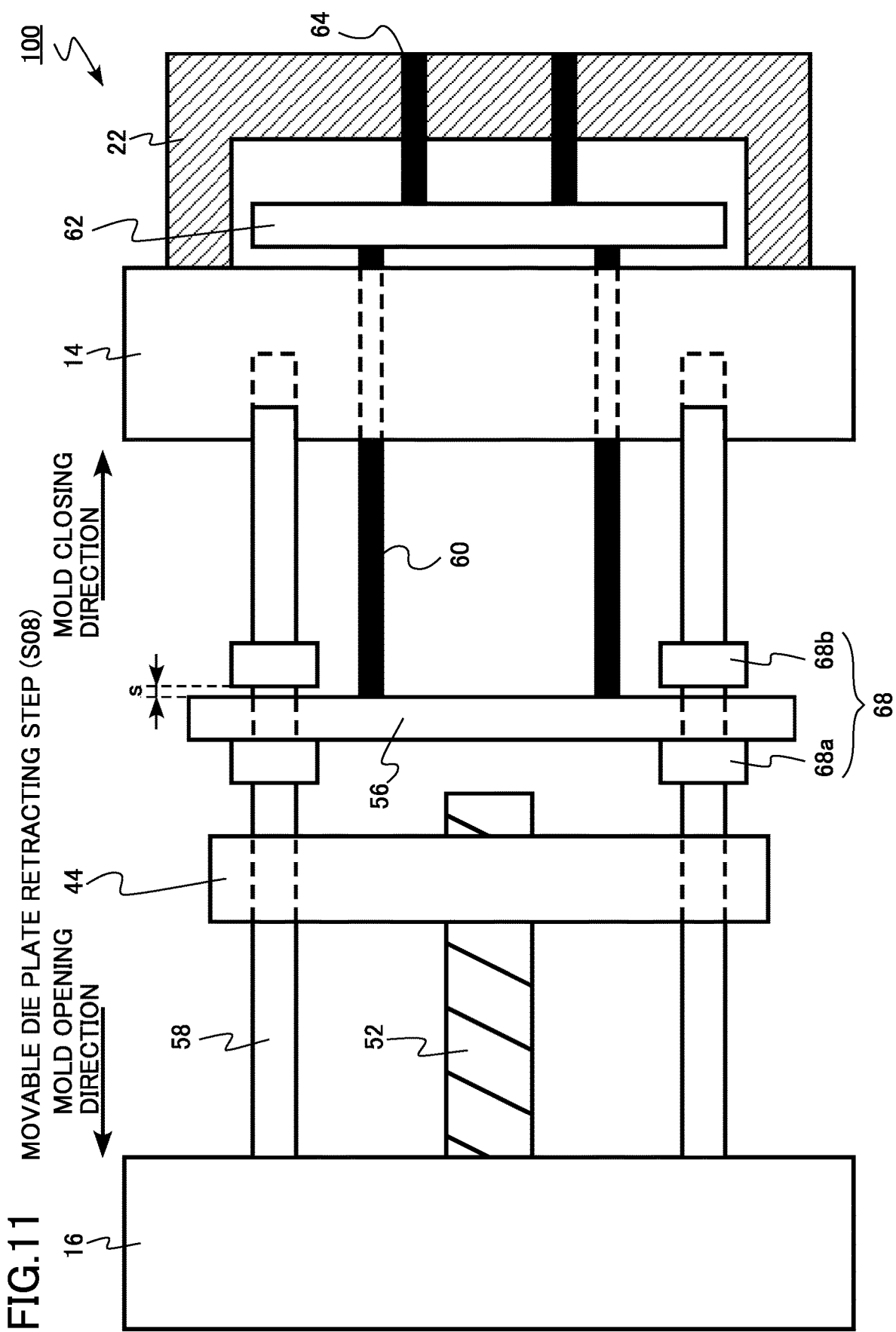
FIG. 11 is an explanatory diagram of the molding operation using the molding machine of the first embodiment.

Next, the link housing 16 and the movable die plate 14 are retracted in the mold opening direction in the movable die plate retracting step (S08) (FIGS. 10 and 11). The link housing 16 and the movable die plate 14 are moved using the toggle moving mechanism 26. The tie bar 18 is pulled out from the fixed die plate 12.

As shown in FIG. 11, the extrusion plate 56 is kept in contact with the first member 68a when the link housing 16 and the movable die plate 14 are retracted to the mold opening position in the mold opening direction.

Figure 12:
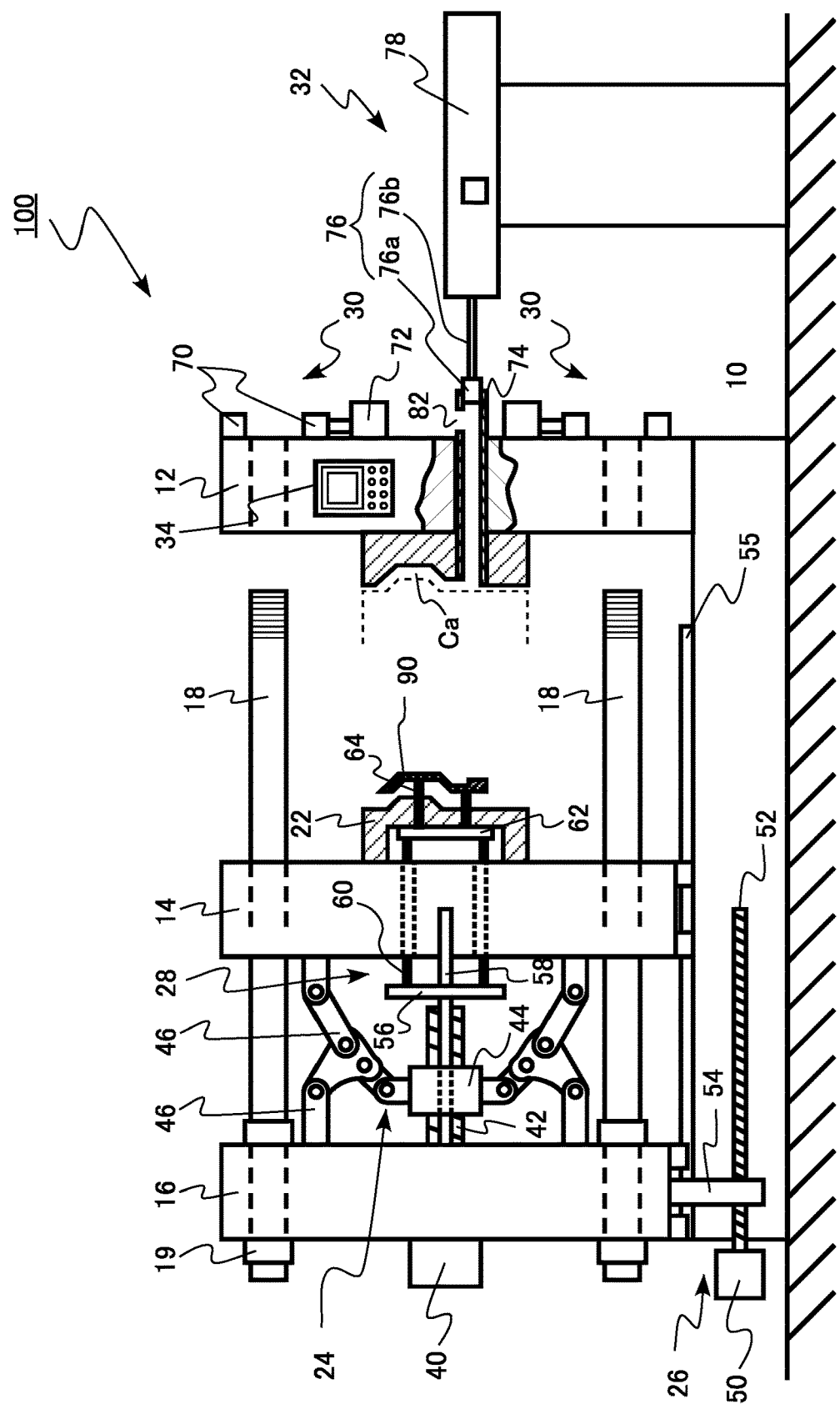
FIG. 12 is an explanatory diagram of the molding operation using the molding machine of the first embodiment.
Figure 13:
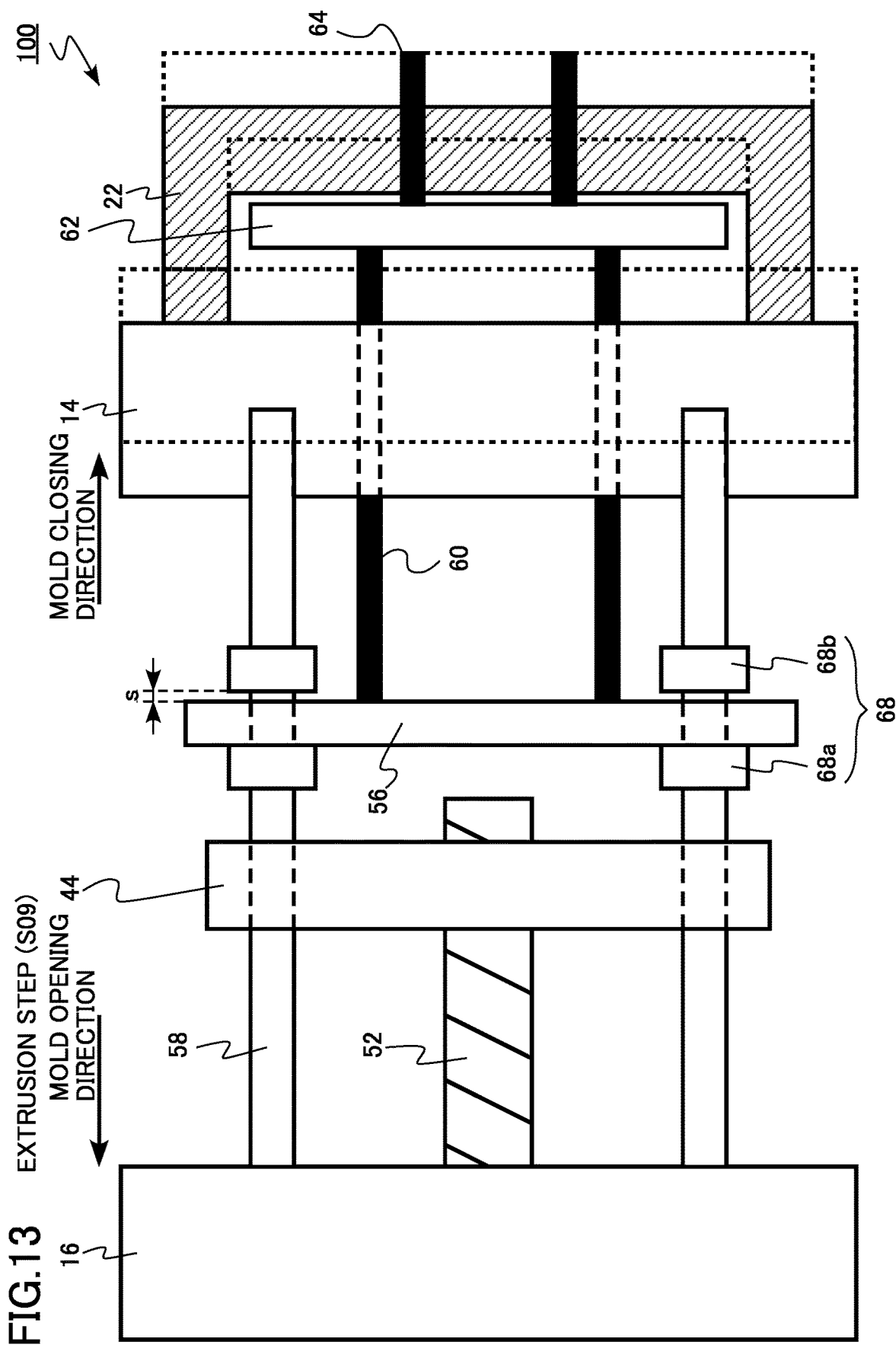
FIG. 13 is an explanatory diagram of the molding operation using the molding machine of the first embodiment.

Next, the die-cast product 90 is extruded using the toggle mechanism 24 in the extrusion step (S09) (FIGS. 12 and 13). Specifically, the movable die plate 14 is moved in the mold opening direction using the toggle mechanism 24. The moving distance of the movable die plate 14 is, for example, 200 mm or less. The die-cast product 90 extruded from the movable die 22 is picked up using, for example, a robot arm (not shown).

In the extrusion step (S09), the extrusion plate 56 is in contact with the first member 68a. Therefore, the extrusion plate 56 does not move in the mold opening direction. Thus, as shown in FIG. 13, the extrusion pin 64 relatively moves in the mold closing direction with respect to the movable die 22 and the die-cast product 90 is extruded from the movable die 22.

Figure 14:
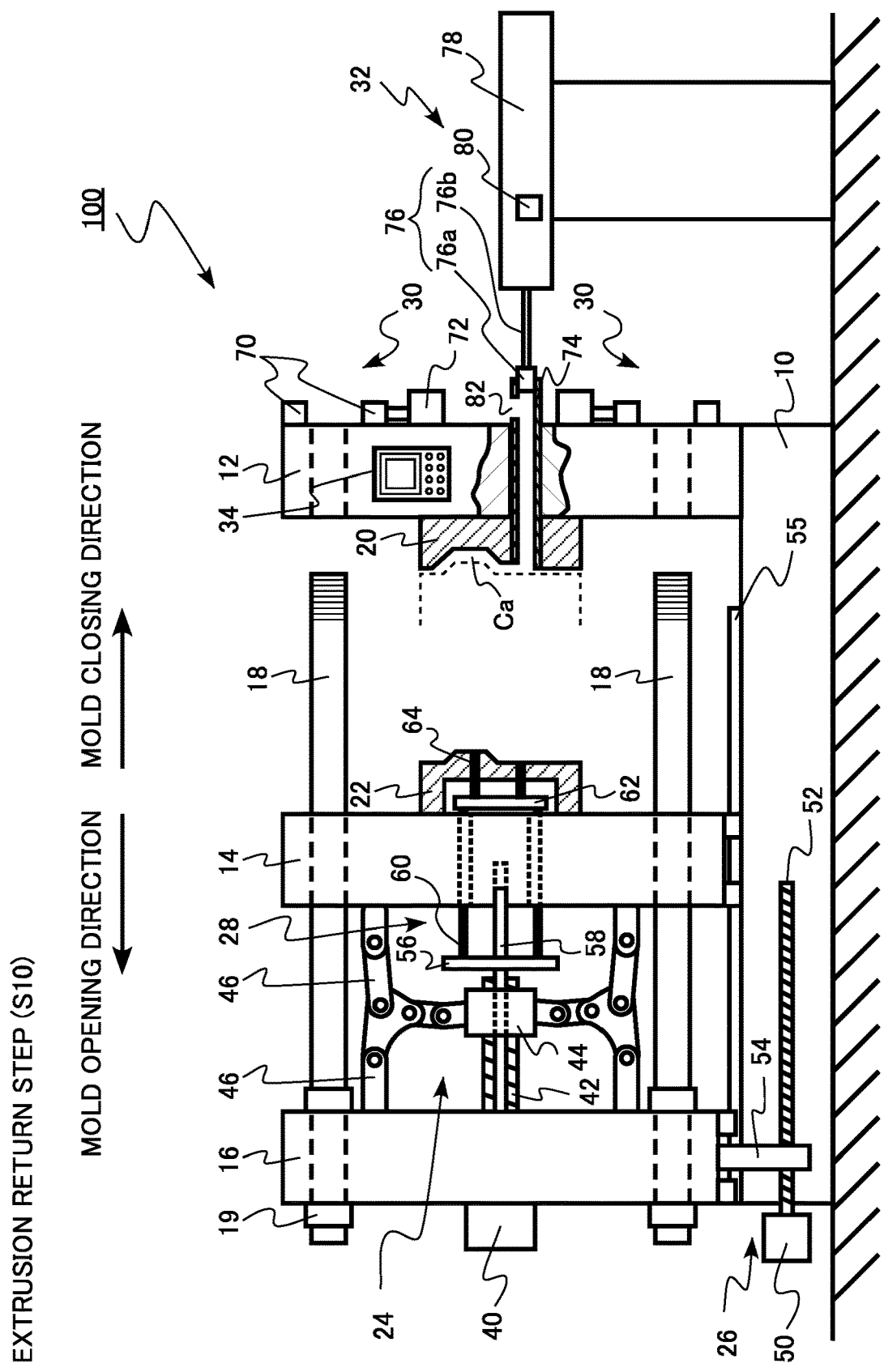
FIG. 14 is an explanatory diagram of the molding operation using the molding machine of the first embodiment.
Figure 15:
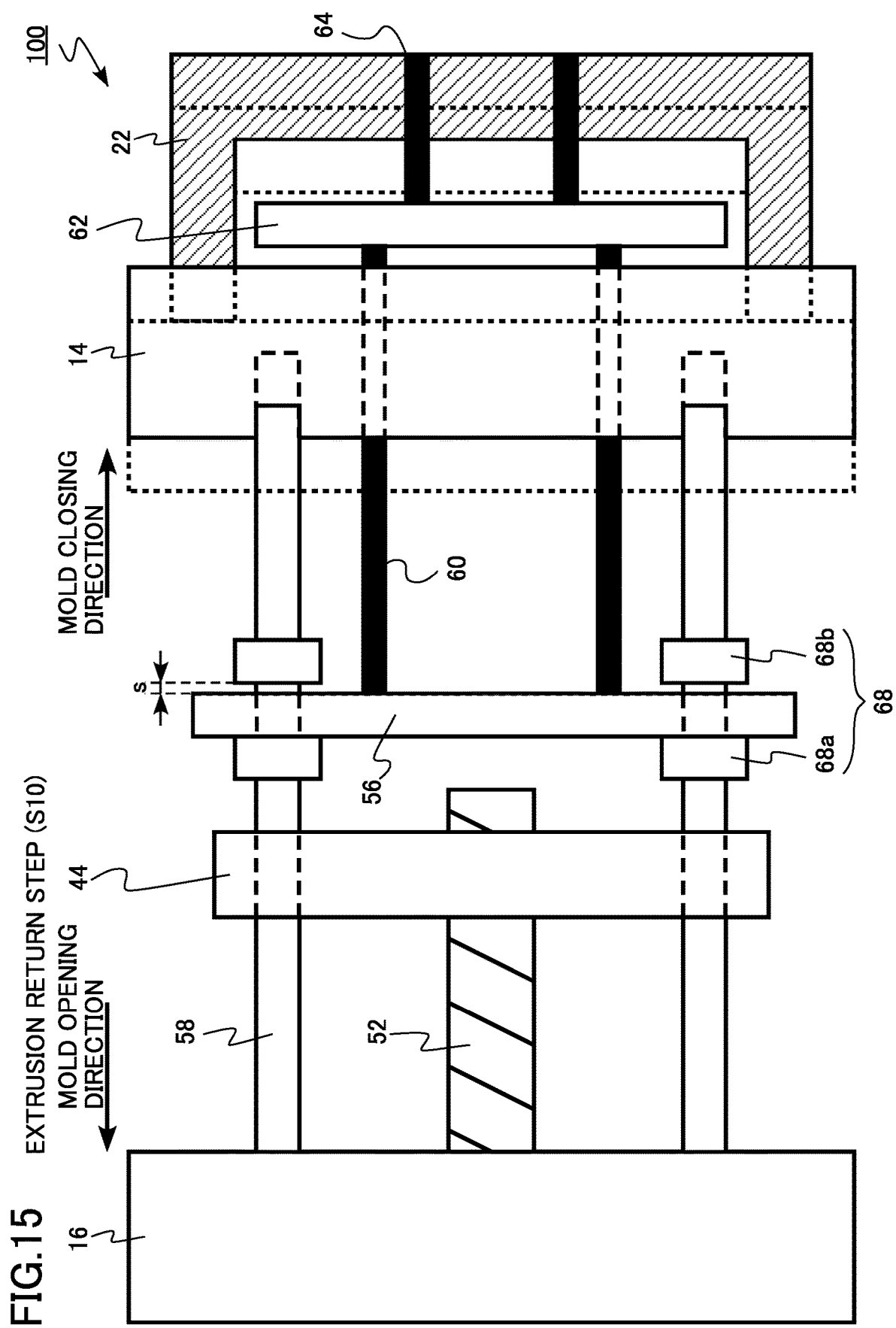
FIG. 15 is an explanatory diagram of the molding operation using the molding machine of the first embodiment.

Next, the movable die plate 14 is returned to the position of the initial state from the state in which the die-cast product 90 is extruded using the toggle mechanism 24 in the extrusion return step (S10) (FIGS. 14 and 15). Specifically, the movable die plate 14 is moved in the mold closing direction using the toggle mechanism 24.

As shown in FIG. 15, the extrusion pin 64 relatively moves in the mold opening direction with respect to the movable die 22 and the extrusion pin 64 enters the movable die 22 in the extrusion return step (S10). A gap (s in FIG. 15)

corresponding to the mold clamping stroke remains between the extrusion plate 56 and the second member 68*b* of the positioning member 68.

By the above-described molding operation, the die-cast product 90 is manufactured. When the next die-cast product is manufactured, the above-described molding operation may be repeated.

Additionally, the movable die plate retracting step (S08), the extrusion step (S09), and the extrusion return step (S10) may be performed in parallel to shorten the molding cycle time. The movable die plate retracting step (S08) uses the toggle moving mechanism 26 and the extrusion step (S09) and the extrusion return step (S10) use the toggle mechanism 24 different from the toggle moving mechanism 26. The toggle moving mechanism 26 uses the toggle moving motor 50 as a power source and the toggle mechanism 24 uses the mold clamping motor 40 different from the toggle moving motor 50 as a power source. Thus, the movable die plate retracting step (S08), the extrusion step (S09), and the extrusion return step (S10) can be performed in parallel.

Next, the function and effect of the molding machine of the first embodiment will be described.

In the die casting machine, in order to decrease the manufacturing cost of the die-cast product, it is desired to realize structure simplification, energy saving, and short molding cycle time of the die casting machine.

The die casting machine 100 of the first embodiment extrudes the die-cast product 90 from the movable die 22 using the toggle mechanism 24 for clamping the mold. Thus, an additional power source such as a motor or a hydraulic device is not required for extruding the die-cast product 90 from the movable die 22. Thus, it is possible to realize structure simplification and energy saving of the die casting machine 100.

Further, the extrusion mechanism 28 using the toggle mechanism 24 of the die casting machine 100 uses the positioning member 68 relatively fixed to the link housing 16. Then, since the position of the extrusion plate 56 is controlled by the positioning member 68, it is possible to obtain a simple mechanism for extruding the die-cast product 90 from the movable die 22. Thus, it is possible to realize structure simplification of the die casting machine 100.

Further, the die casting machine 100 moves the movable die plate 14 and the link housing 16 using the toggle moving mechanism 26 so that the movable die 22 comes into contact with the fixed die 20. Thus, it is sufficient that the stroke of the toggle mechanism 24 can secure the stroke for clamping the mold and the stroke for extruding the die-cast product 90. The stroke for clamping the mold is, for example, 10 mm or less and the stroke for extruding the die-cast product 90 is, for example, 200 mm or less. Thus, it is possible to miniaturize the toggle mechanism 24 and to suppress the stroke of the toggle mechanism 24 to be a small size. Thus, it is possible to realize structure simplification of the die casting machine 100.

Further, the die casting machine 100 uses an electric motor for both the toggle mechanism 24 and the toggle moving mechanism 26. By using the electric motor, for example, it is not necessary to provide a large-capacity oil tank required when using a hydraulic system. Thus, it is possible to realize structure simplification of the die casting machine 100.

Further, since the die casting machine 100 uses an electric motor for both the toggle mechanism 24 and the toggle moving mechanism 26, the operating speed is improved compared to the case of using a hydraulic system. Thus, it is possible to realize short molding cycle time of the die casting machine 100.

Further, since the link housing 16 can be moved by the toggle moving mechanism 26, it is possible to shorten the length of the tie bar 18. Thus, it is possible to realize structure simplification of the die casting machine 100.

Additionally, since the length of the tie bar 18 is shortened, it is possible to secure a space between the end portion on the side of the fixed die plate 12 in the tie bar 18 and the fixed die plate 12 in the initial state in which the mold is opened. Since it is possible to attach and detach the mold using this space, it is not necessary to install, for example, a tie bar pulling device for attaching and detaching the mold. Thus, it is possible to realize structure simplification of the die casting machine 100.

As described above, according to the first embodiment, the die casting machine can realize structure simplification, energy saving, and short cycle time.

Second Embodiment

A molding machine of a second embodiment is different from the molding machine of the first embodiment in that a positioning member is a bar-shaped member. Hereinafter, some descriptions of the contents overlapping with the first embodiment will be omitted.

Figure 16:
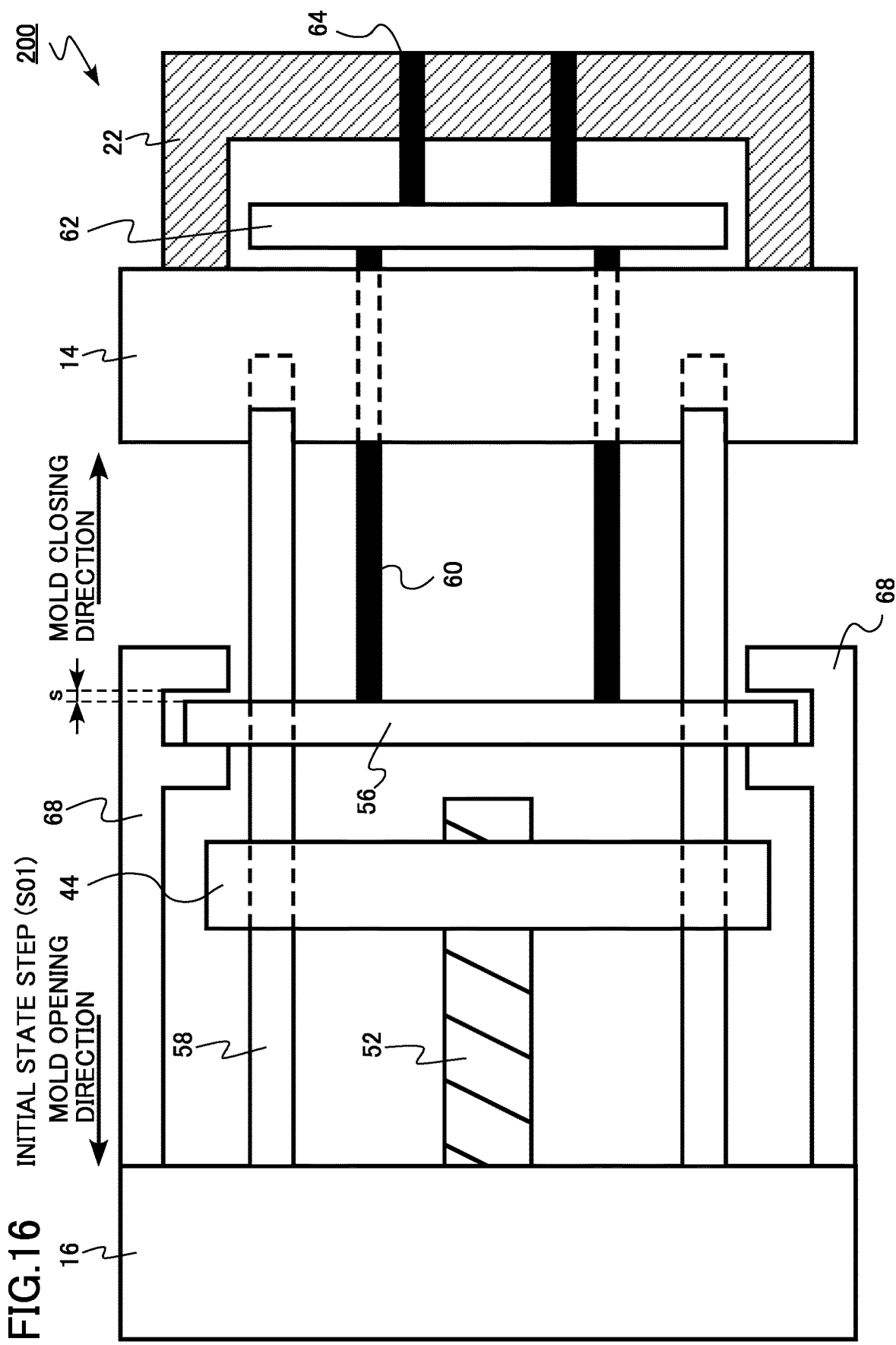
FIG. 16 is an enlarged schematic view of an extrusion mechanism of a molding machine of a second embodiment.

FIG. 16 is an enlarged schematic view of the extrusion mechanism of the molding machine of the second embodiment. FIG. 16 is a plan view including a cross-sectional view in part.

The molding machine of the second embodiment is a die casting machine. A die casting machine 200 of the second embodiment is a cold chamber type die casting machine.

FIG. 16 shows an initial state before the start of the operation of the die casting machine 200. The initial state in this case is a state in which the mold is fully opened, that is, a so-called mold opening state.

As shown in FIG. 16, the positioning member 68 is fixed to the link housing 16. The positioning member 68 is a bar-shaped member. The end portion on the side of the movable die plate 14 in the bar-shaped member is provided with a pair of protrusions for positioning the extrusion plate 56.

The gap between the pair of protrusions is larger than the thickness of the extrusion plate 56 in the mold opening and closing direction.

Also in the die casting machine 200 of the second embodiment, similarly to the die casting machine 100 of the first embodiment, the positioning member 68 is relatively fixed to the link housing 16. Thus, since the position of the extrusion plate 56 is controlled by the positioning member 68 in terms of the same action as the die casting machine 100 of the first embodiment, it is possible to realize the simple extrusion mechanism 28 extruding the die-cast product 90 from the movable die 22.

As described above, according to the second embodiment, similarly to the first embodiment, the die casting machine can realize structure simplification, energy saving, and short cycle time.

Third Embodiment

A molding machine of a third embodiment is different from the molding machine of the second embodiment in that a guide bar is fixed to a movable die plate. Hereinafter, some descriptions of the contents overlapping with the second embodiment will be omitted.

Figure 17:
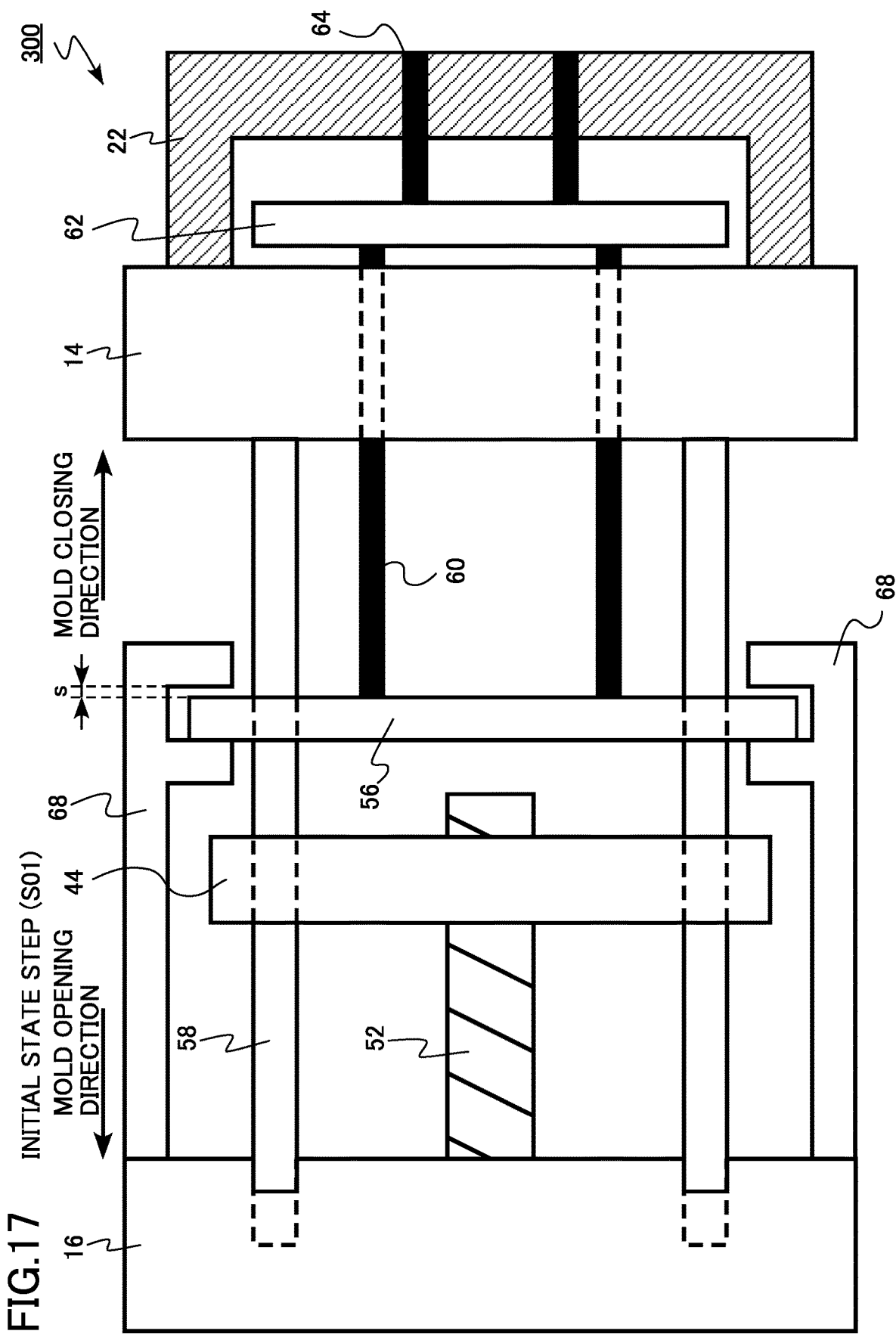
FIG. 17 is an enlarged schematic view of an extrusion mechanism of a molding machine of a third embodiment.

FIG. 17 is an enlarged schematic view of the extrusion mechanism of the molding machine of the third embodiment. FIG. 17 is a plan view including a cross-sectional view in part.

The molding machine of the third embodiment is a die casting machine. The die casting machine 300 of the third embodiment is a cold chamber type die casting machine.

FIG. 17 shows an initial state before the start of the operation of the die casting machine 300. The initial state in this case is a state in which the mold is fully opened, that is, a so-called mold opening state.

As shown in FIG. 17, the guide bar 58 is fixed to the movable die plate 14. The positioning member 68 is fixed to the link housing 16. The positioning member 68 is a bar-shaped member. The end portion on the side of the movable die plate 14 in the bar-shaped member is provided with a pair of protrusions for positioning the extrusion plate 56.

Also in the die casting machine 300 of the third embodiment, similarly to the die casting machine 100 of the first embodiment and the die casting machine 200 of the second embodiment, the positioning member 68 is relatively fixed to the link housing 16. Thus, since the position of the extrusion plate 56 is controlled by the positioning member 68 in terms of the same action as the die casting machine 100 of the first embodiment and the die casting machine 200 of the second embodiment, it is possible to realize the simple extrusion mechanism 28 extruding the die-cast product 90 from the movable die 22.

As described above, according to the third embodiment, similarly to the first and second embodiments, the die casting machine can realize structure simplification, energy saving, and short cycle time.

Fourth Embodiment

A molding machine of a fourth embodiment is different from the molding machine of the first embodiment in that a tie bar is fixed to a fixed die plate and is slidable with respect to a link housing. Hereinafter, some descriptions of the contents overlapping with the first embodiment will be omitted.

Figure 18:
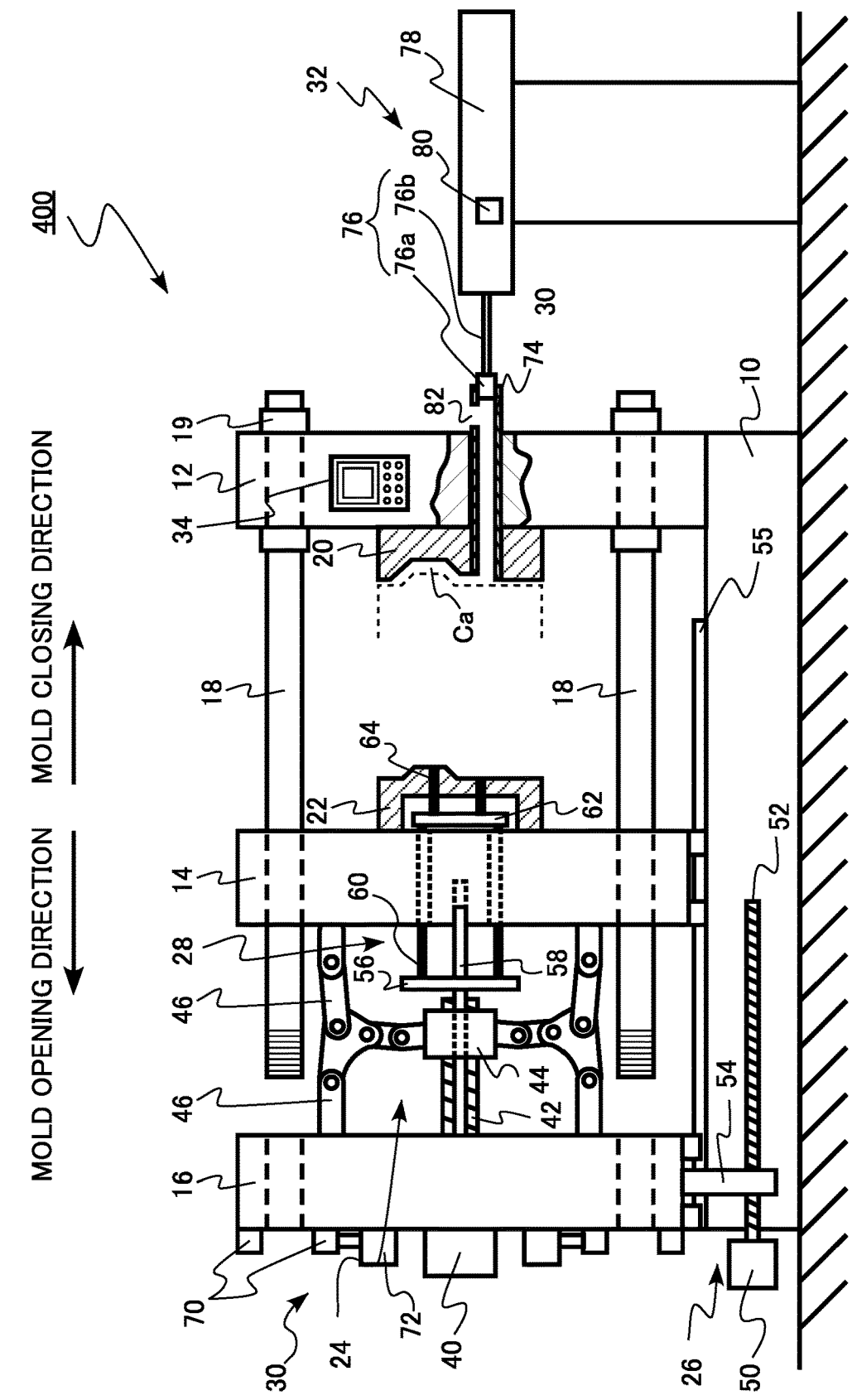
FIG. 18 is a schematic view showing an entire configuration of a molding machine of a fourth embodiment.
Figure 19:
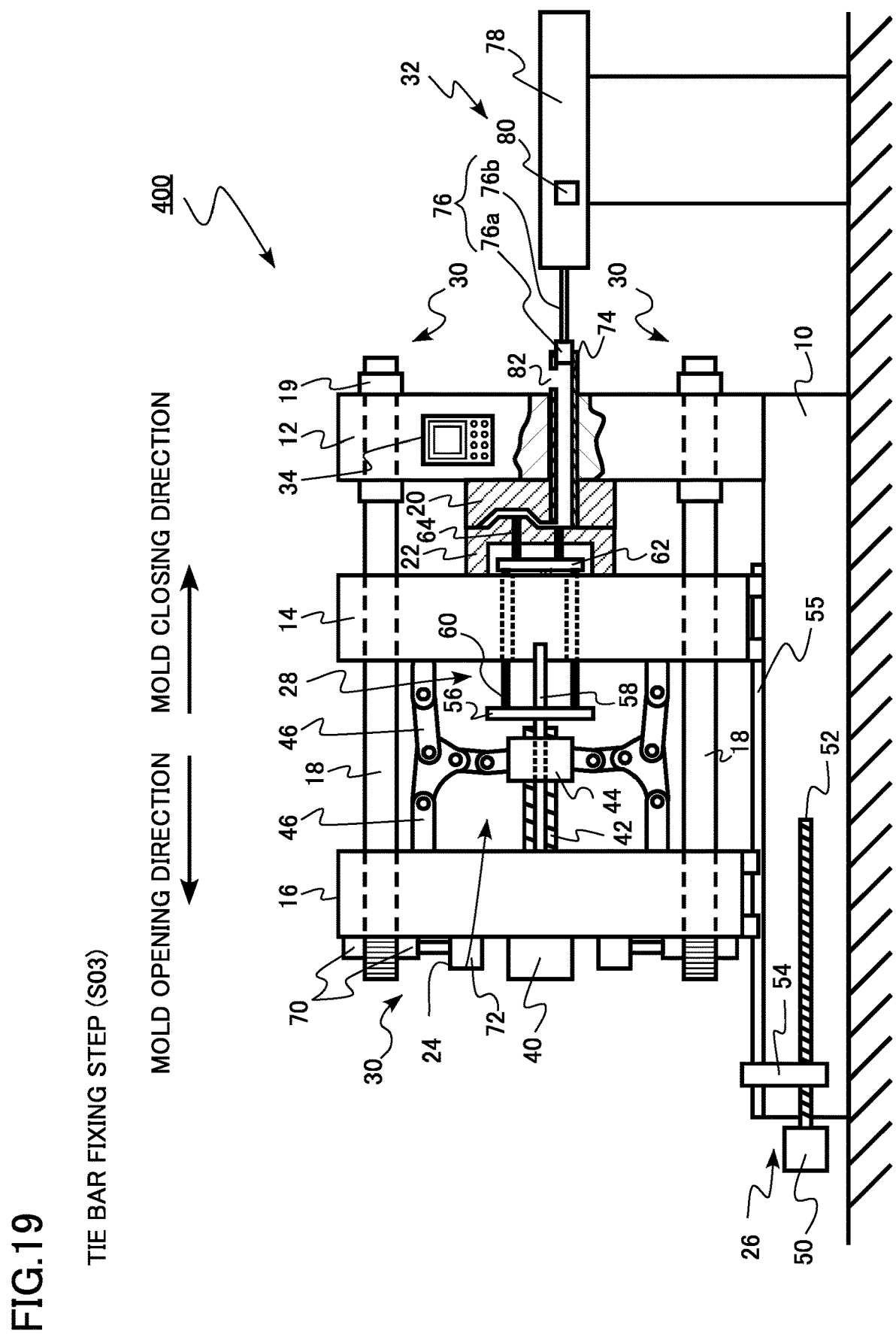
FIG. 19 is a schematic view showing the entire configuration of the molding machine of the fourth embodiment.

FIGS. 18 and 19 are schematic views showing the entire configuration of the molding machine of the fourth embodiment. FIGS. 18 and 19 are side views including cross-sectional views in part.

The molding machine of the fourth embodiment is a die casting machine. A die casting machine 400 of the fourth embodiment is a cold chamber type die casting machine.

FIG. 18 shows an initial state before the start of the operation of the die casting machine 400. The initial state in this case is a state in which the mold is fully opened, that is, a so-called mold opening state. FIG. 19 is a diagram showing the state of the tie bar fixing step (S03) of the die casting machine 400.

As shown in FIG. 18, the tie bar 18 is fixed to the fixed die plate 12 and is slidable with respect to the link housing 16.

The tie bar 18 extends in the mold opening and closing direction. For example, four tie bars 18 are provided.

The tie bar 18 can be fixed to the link housing 16 and the fixed die plate 12. The tie bar 18 is fixed to the fixed die plate 12 by the tie bar nut 19. The tie bar 18 penetrates the movable die plate 14. The tie bar 18 is slidable with respect to the link housing 16.

The tie bar fixing mechanism 30 is provided in the link housing 16. The tie bar 18 can be fixed or non-fixed to the link housing 16 using the tie bar fixing mechanism 30.

For example, a saw-shaped groove is provided at the tip on the side of the link housing 16 in the tie bar 18. The tie bar fixing mechanism 30 controls the opening and closing of the half nut 70, for example, by the tie bar fixing motor 72. For example, when the half nut 70 is closed, the half nut 70 is fitted into the groove of the tip of the tie bar 18 so that the tie bar 18 is fixed to the link housing 16. The tie bar fixing mechanism 30 fixes the tie bar 18 to a desired position (FIG. 19).

The tie bar 18 supports a mold clamping force while the mold clamping force is applied to the fixed die 20 and the movable die 22.

The tie bar 18 is fixed to the fixed die plate 12 and the end portion on the side of the link housing 16 in the tie bar 18 at the most separation position between the link housing 16 and the fixed die plate 12 is located on the side of the movable die plate 14 in relation to the link housing 16. The end portion on the side of the link housing 16 in the tie bar 18 at the most separation position between the link housing 16 and the fixed die plate 12 is located between the link housing 16 and the movable die plate 14.

The tie bar 18 is fixed to the fixed die plate 12 and the end portion on the side of the link housing 16 in the tie bar 18 at the most separation position between the movable die plate 14 and the fixed die plate 12 is located on the side of the movable die plate 14 in relation to the link housing 16. The end portion on the side of the link housing 16 in the tie bar 18 at the most separation position between the movable die plate 14 and the fixed die plate 12 is located between the link housing 16 and the movable die plate 14.

Also in the die casting machine 400 of the fourth embodiment, similarly to the die casting machine 100 of the first embodiment, the positioning member 68 is relatively fixed to the link housing 16. Thus, since the position of the extrusion plate 56 is controlled by the positioning member 68 in terms of the same action as the die casting machine 100 of the first embodiment, it is possible to realize the simple extrusion mechanism 28 extruding the die-cast product 90 from the movable die 22.

As described above, according to the fourth embodiment, similarly to the first embodiment, the die casting machine can realize structure simplification, energy saving, and short cycle time.

Fifth Embodiment

A molding machine of a fifth embodiment is different from the molding machine of the first embodiment in that a guide of a tie bar fixed to a fixed housing is provided. Hereinafter, some descriptions of the contents overlapping with the first embodiment will be omitted.

Figure 20:
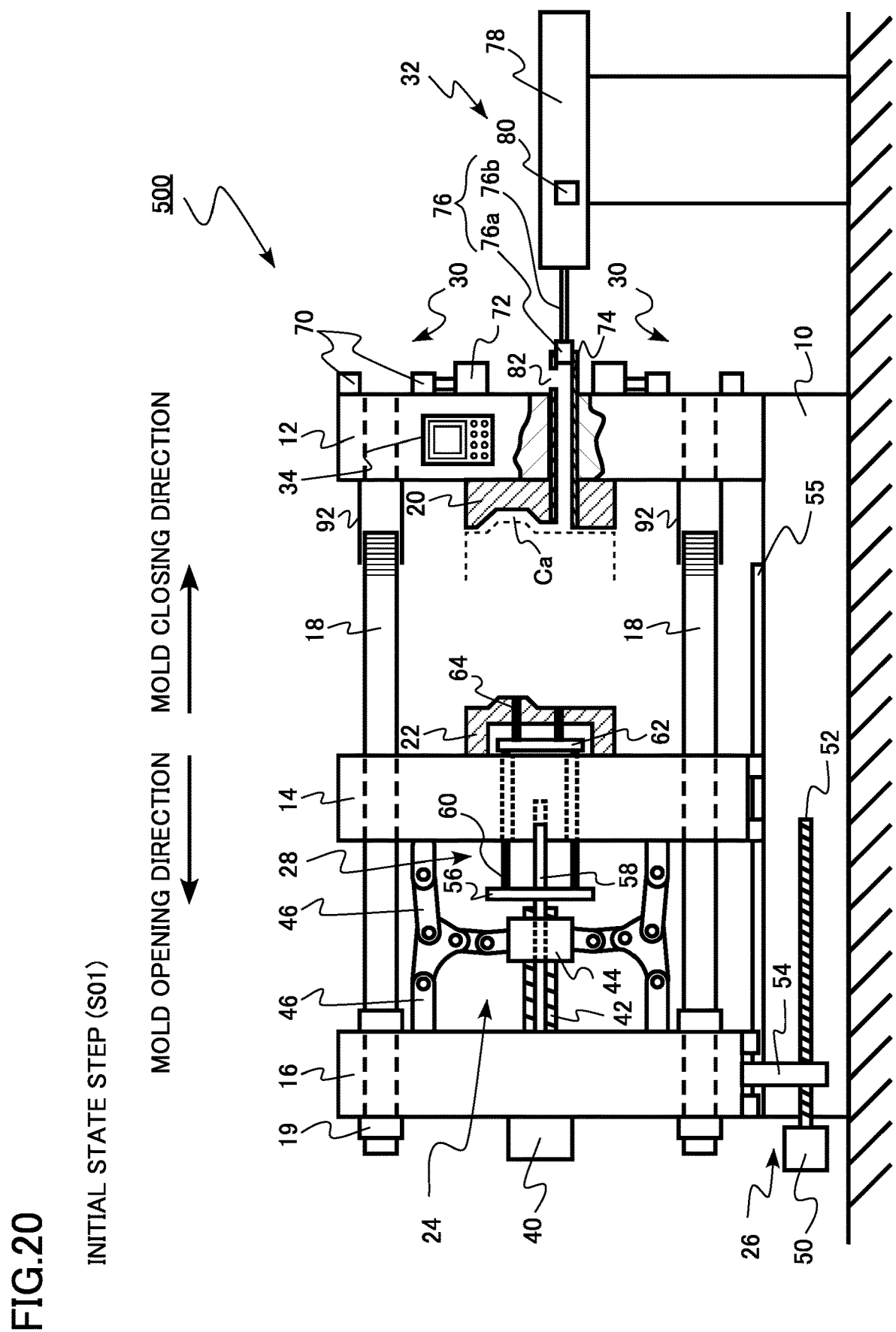
FIG. 20 is a schematic view showing an entire configuration of a molding machine of a fifth embodiment.

FIG. 20 is a schematic view showing the entire configuration of the molding machine of the fifth embodiment. FIG. 20 is a side view including a cross-sectional view in part.

The molding machine of the fifth embodiment is a die casting machine. A die casting machine 500 of the fifth embodiment is a cold chamber type die casting machine.

FIG. 20 shows an initial state before the start of the operation of the die casting machine 500. The initial state in this case is a state in which the mold is fully opened, that is, a so-called mold opening state.

As shown in FIG. 20, the die casting machine 500 includes a guide 92 of the tie bar 18. The guide 92 is fixed to the fixed die plate 12. The guide 92 has, for example, a cylindrical shape.

The tie bar 18 can penetrate the guide 92. By providing the guide 92, the insertion operation and the removal operation of the tie bar 18 with respect to the fixed die plate 12 are stabilized.

Also in the die casting machine 500 of the fifth embodiment, similarly to the die casting machine 100 of the first embodiment, the positioning member 68 is relatively fixed to the link housing 16. Thus, since the position of the extrusion plate 56 is controlled by the positioning member 68 in terms of the same action as the die casting machine 100 of the first embodiment, it is possible to realize the simple extrusion mechanism 28 extruding the die-cast product 90 from the movable die 22.

As described above, according to the fifth embodiment, similarly to the first embodiment, the die casting machine can realize structure simplification, energy saving, and short cycle time. By providing the guide 92, the insertion operation and the removal operation of the tie bar 18 with respect to the fixed die plate 12 are stabilized.

Sixth Embodiment

A molding machine of a sixth embodiment is different from the molding machine of the first embodiment in that an end portion on the side of a fixed die plate in a tie bar at the most separation position between a link housing and the fixed die plate is located on the side opposite to a movable die plate in the fixed die plate. Hereinafter, some descriptions of the contents overlapping with the first embodiment will be omitted.

Figure 21:
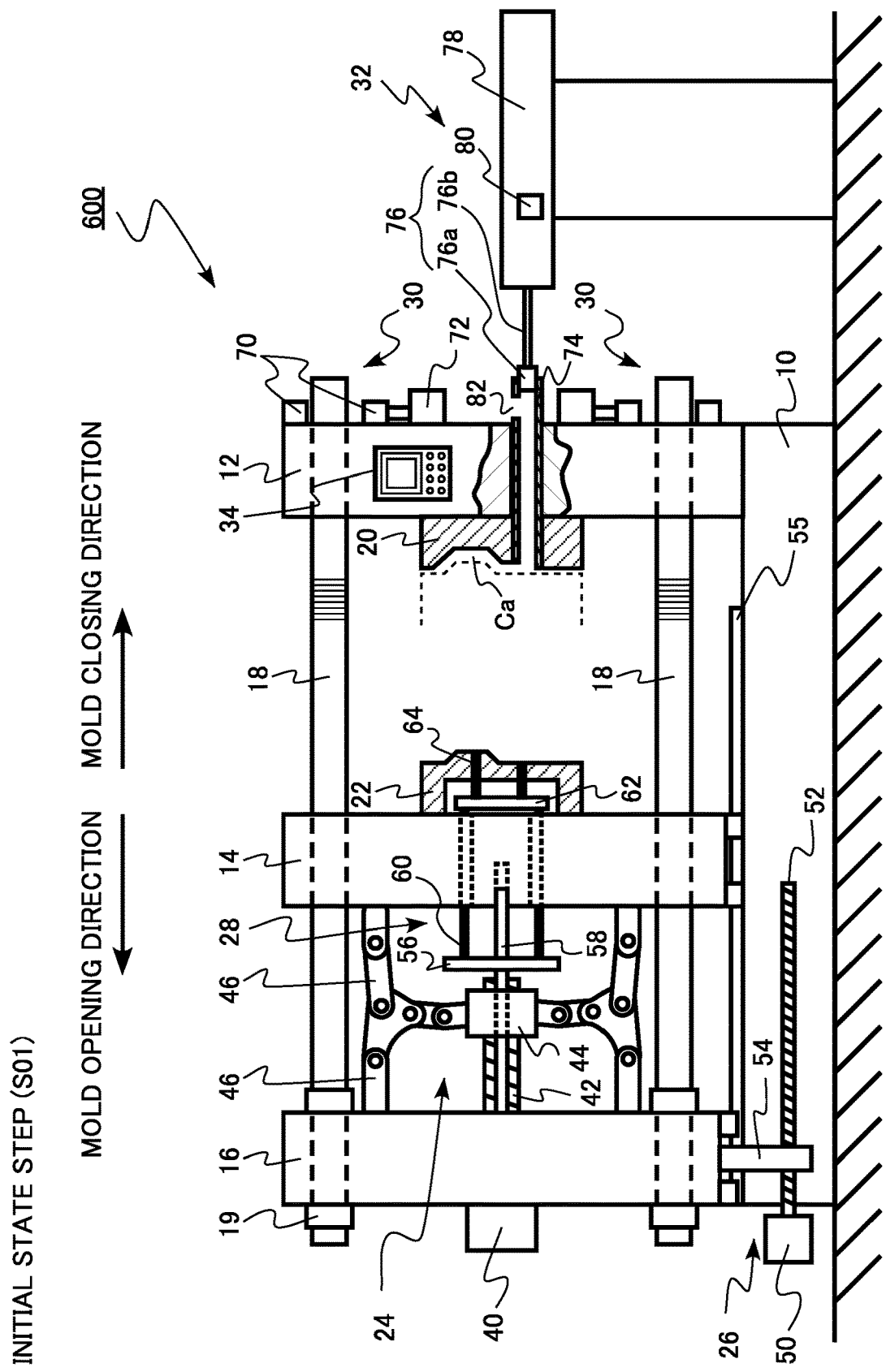
FIG. 21 is a schematic view showing an entire configuration of a molding machine of a sixth embodiment.

FIG. 21 is a schematic view showing the entire configuration of the molding machine of the sixth embodiment. FIG. 21 is a side view including a cross-sectional view in part.

The molding machine of the sixth embodiment is a die casting machine. A die casting machine 600 of the sixth embodiment is a cold chamber type die casting machine.

FIG. 21 shows an initial state before the start of the operation of the die casting machine 600. The initial state in this case is a state in which the mold is fully opened, that is, a so-called mold opening state.

As shown in FIG. 21, the end portion on the side of the fixed die plate 12 in the tie bar 18 at the most separation position between the link housing 16 and the fixed die plate 12 is located on the side opposite to the movable die plate 14 in the fixed die plate 12. The tie bar 18 is always in a state of penetrating the fixed die plate 12 during the molding operation of the die casting machine 600.

Also in the die casting machine 600 of the sixth embodiment, similarly to the die casting machine 100 of the first embodiment, the positioning member 68 is relatively fixed to the link housing 16. Thus, since the position of the extrusion plate 56 is controlled by the positioning member 68 in terms of the same action as the die casting machine 100 of the first embodiment, it is possible to realize the simple extrusion mechanism 28 extruding the die-cast product 90 from the movable die 22.

As described above, according to the sixth embodiment, similarly to the first embodiment, the die casting machine can realize structure simplification, energy saving, and short cycle time.

Seventh Embodiment

A molding machine of a seventh embodiment is different from the molding machine of the first embodiment in that a fixing mechanism fixing a tie bar to a desired position includes a locking plate. Hereinafter, some descriptions of the contents overlapping with the first embodiment will be omitted.

Figure 22:
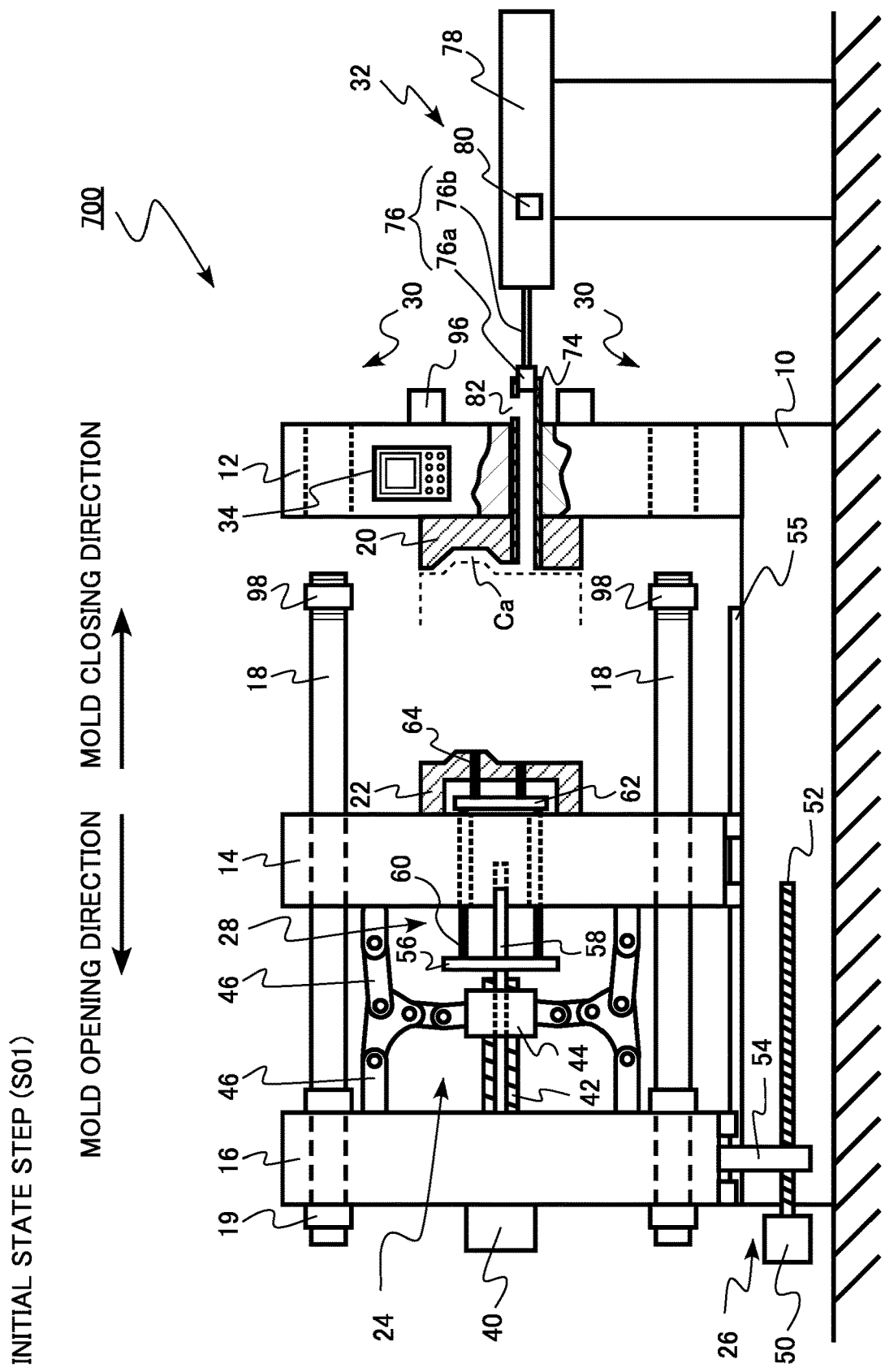
FIG. 22 is a schematic view showing an entire configuration of a molding machine of a seventh embodiment.

FIGS. 22 and 23 are schematic views showing the entire configuration of the molding machine of the seventh embodiment. FIGS. 22 and 23 are side views including cross-sectional views in part.

The molding machine of the seventh embodiment is a die casting machine. A die casting machine 700 of the seventh embodiment is a cold chamber type die casting machine.

FIG. 22 shows an initial state before the start of the operation of the die casting machine 700. The initial state in this case is a state in which the mold is fully opened, that is, a so-called mold opening state. FIG. 23 is a diagram showing a state of the tie bar fixing step (S03) of the die casting machine 700.

The tie bar fixing mechanism 30 is provided in the fixed die plate 12. The tie bar 18 can be fixed or non-fixed to the fixed die plate 12 using the tie bar fixing mechanism 30.

The tie bar fixing mechanism 30 includes a locking plate 94 (lock plate) and a locking plate rotating motor 96. The locking plate 94 is rotatably provided by the locking plate rotating motor 96.

As shown in FIG. 23, it is possible to fix the tie bar 18 to the fixed die plate 12 in such a manner that the locking plate 94 is rotated to be inserted between the fixed die plate 12 and the nut 98 provided in the tie bar 18.

Also in the die casting machine 700 of the seventh embodiment, similarly to the die casting machine 100 of the first embodiment, the positioning member 68 is relatively fixed to the link housing 16. Thus, since the position of the extrusion plate 56 is controlled by the positioning member 68 in terms of the same action as the die casting machine 100 of the first embodiment, it is possible to realize the simple extrusion mechanism 28 extruding the die-cast product 90 from the movable die 22.

As described above, according to the seventh embodiment, similarly to the first embodiment, the die casting machine can realize structure simplification, energy saving, and short cycle time.

Eighth Embodiment

A molding machine of an eighth embodiment is different from the molding machine of the first embodiment in that a movable housing is driven by a second motor. Hereinafter, some descriptions of the contents overlapping with the first embodiment will be omitted.

FIG. 24 is a schematic view showing the entire configuration of the molding machine of the eighth embodiment. FIG. 24 is a side view including a cross-sectional view in part.

The molding machine of the eighth embodiment is a die casting machine. A die casting machine 800 of the eighth embodiment is a cold chamber type die casting machine.

FIG. 24 shows an initial state before the start of the operation of the die casting machine 800. The initial state in this case is a state in which the mold is fully opened, that is, a so-called mold opening state.

The nut portion 54 of the toggle moving mechanism 26 is fixed to the movable die plate 14. When the second screw shaft 52 is rotated by the toggle moving motor 50, the nut portion 54 moves in the mold opening and closing direction. When the nut portion 54 moves in the mold opening and closing direction, the link housing 16 connected to the movable die plate 14 moves in the mold opening and closing direction by the plurality of links 46 and the movable die plate 14 fixed to the nut portion 54. The link housing 16 and the movable die plate 14 move on the guide rail 55. The toggle moving motor 50 drives the movable die plate 14 instead of the link housing 16 through the second screw shaft 52 and the nut portion 54.

Also in the die casting machine 800 of the eighth embodiment, similarly to the die casting machine 100 of the first embodiment, the positioning member 68 is relatively fixed to the link housing 16. Thus, since the position of the extrusion plate 56 is controlled by the positioning member 68 in terms of the same action as the die casting machine 100 of the first embodiment, it is possible to realize the simple extrusion mechanism 28 extruding the die-cast product 90 from the movable die 22.

As described above, according to the eighth embodiment, similarly to the first embodiment, the die casting machine can realize structure simplification, energy saving, and short cycle time.

As described above, the embodiments of the invention have been described with reference to detailed examples. However, the invention is not limited to these detailed examples. In the embodiments, although the description of the portion of the molding machine or the like that is not directly required for the description of the invention is omitted, the required elements related to the molding machine or the like can be appropriately selected and used.

In the first to eighth embodiments, the die casting machine has been described as the example of the molding machine, but the invention can be also applied to an injection molding machine and the like.

In addition, all water heaters and molding machines having the elements of the invention and appropriately redesigned by those skilled in the art are included in the scope of the invention. The scope of the invention is defined by the scope of claims and the scope of their equivalents.

What is claimed is:

1. A molding machine comprising:
    a base;
    a fixed die plate fixed onto the base and holding a fixed die;
    a movable die plate provided on the base to be movable in a mold opening and closing direction and holding a movable die to face the fixed die;
    a toggle mechanism capable of clamping the fixed die and the movable die, the toggle mechanism including a plurality of links;
    a link housing provided on the base to be movable in the mold opening and closing direction and allowing one end of a part of the plurality of links to be fixed thereto;
    a first motor configured to drive the toggle mechanism;
    a first screw shaft configured to drive the toggle mechanism, the first screw shaft configured to rotate by the first motor;
    a crosshead configured to drive the toggle mechanism, the crosshead configured to move in the mold opening and closing direction by rotation of the first screw shaft, the plurality of links configured to move in accordance with movement of the crosshead;
    a second motor configured to move the movable die plate and the link housing;
    an extrusion plate arranged to allow an extrusion pin to appear and disappear in the movable die;
    a guide bar fixed to any one of the link housing and the movable die plate, penetrating the extrusion plate, and slidably holding the extrusion plate;
    a positioning member positioning the extrusion plate;
    a tie bar fixable to the link housing and the fixed die plate and extending in the mold opening and closing direction; and
    an injection device configured to fill a molten metal into a cavity formed by the fixed die and the movable die.

2. The molding machine according to claim 1, wherein the guide bar is fixed to the link housing.

3. The molding machine according to claim 2, wherein the positioning member is fixed to the guide bar.

4. The molding machine according to claim 3, wherein the positioning member comprises a pair of annular members provided to sandwich the extrusion plate.

5. The molding machine according to claim 4, wherein a gap between the pair of annular members is larger than a thickness of the extrusion plate.

6. The molding machine according to claim 4, wherein a difference between the gap between the pair of annular members and the thickness of the extrusion plate is 10 mm or less.

7. The molding machine according to claim 1, wherein the guide bar is fixed to the movable die plate.

8. The molding machine according to claim 1, wherein a displacement amount of a gap between the link housing and the movable die plate is 210 mm or less.

9. The molding machine according to claim 1, wherein the tie bar is fixed to any one of the link housing and the fixed die plate and is slidable with respect to the other of the link housing and the fixed die plate.

10. The molding machine according to claim 9, further comprising:
    a fixing mechanism fixing the tie bar to a desired position in the other of the link housing and the fixed die plate.

11. The molding machine according to claim 1, wherein the tie bar is fixed to the link housing and an end portion on the side of the fixed die plate in the tie bar at a position of greatest separation between the link housing and the fixed die plate is located on the side of the movable die plate in relation to the fixed die plate.

12. The molding machine according to claim 1, wherein the link housing is configured to be driven by the second motor.

13. The molding machine according to claim 1, wherein the movable die plate is configured to be driven by the second motor.

* * * * *